US012639853B2

(12) United States Patent
Wang et al.

(10) Patent No.: US 12,639,853 B2
(45) Date of Patent: May 26, 2026

(54) METHOD AND APPARATUS FOR CALIBRATING CAMERA AND INERTIAL MEASUREMENT UNIT, AND COMPUTER DEVICE

(71) Applicant: TENCENT TECHNOLOGY (SHENZHEN) COMPANY LIMITED, Shenzhen (CN)

(72) Inventors: Haichuan Wang, Shenzhen (CN); Ji Jiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/637,679

(22) Filed: Apr. 17, 2024

(65) Prior Publication Data

US 2024/0282006 A1    Aug. 22, 2024

Related U.S. Application Data

(63) Continuation of application No. PCT/CN2023/114477, filed on Aug. 23, 2023.

(30) Foreign Application Priority Data

Sep. 29, 2022    (CN) .......................... 202211194949.0

(51) Int. Cl.
*G06T 7/80*    (2017.01)
*G06T 7/70*    (2017.01)
(Continued)

(52) U.S. Cl.
CPC .................. *G06T 7/80* (2017.01); *G06T 7/70* (2017.01); *G06V 10/24* (2022.01); *G06V 10/44* (2022.01);
(Continued)

(58) Field of Classification Search
CPC .. G06T 7/80; G06T 7/70; G06T 7/593; G06T 2207/10016; G06T 2207/10028;
(Continued)

(56) References Cited

U.S. PATENT DOCUMENTS 12,354,305 B1 *    7/2025    Hu .......................... G06T 7/248
2010/0220173 A1    9/2010    Anguelov et al.
(Continued)

FOREIGN PATENT DOCUMENTS

CN    107680133 A    2/2018
CN    109141396 A    1/2019
(Continued)

OTHER PUBLICATIONS

Jessica&jie, "Reprojection error and symmetry transfer error", Blog Park, Jul. 26, 2017 4 Pages.
(Continued)

*Primary Examiner* — Fernando Alcon
(74) *Attorney, Agent, or Firm* — Anova Law Group, PLLC

(57) ABSTRACT

A method for calibrating cameras and an inertial measurement unit (IMU) includes: obtaining image sequences acquired by the cameras; matching feature points of different images in the image sequences, to obtain matched feature points; selecting target feature points from the matched feature points; converting the target feature points into three-dimensional points, and determining poses of the cameras based on the three-dimensional points and pixel points of the images in the image sequences that correspond to the three-dimensional points; and optimizing parameters between an IMU and the cameras according to the poses of the cameras and a pose of the IMU.

19 Claims, 14 Drawing Sheets

(51) Int. Cl.
| | |
|---|---|
| *G06V 10/24* | (2022.01) |
| *G06V 10/44* | (2022.01) |
| *G06V 10/75* | (2022.01) |
| *G06V 20/58* | (2022.01) |

(52) U.S. Cl.
CPC ............ *G06V 10/751* (2022.01); *G06V 20/58* (2022.01); *G06V 2201/07* (2022.01)

(58) Field of Classification Search
CPC ........... G06T 2207/30244; G06T 2207/30252; G06V 10/24; G06V 10/44; G06V 10/751; G06V 20/58; G06V 2201/07; G06V 10/757; G01C 25/005
See application file for complete search history.

(56) References Cited

U.S. PATENT DOCUMENTS

| | | | | |
|---|---|---|---|---|
| 2017/0067739 | A1* | 3/2017 | Siercks | H04N 23/55 |
| 2017/0301111 | A1* | 10/2017 | Zhao | H04N 23/90 |
| 2018/0046187 | A1* | 2/2018 | Martirosyan | G05D 1/0094 |
| 2018/0139436 | A1* | 5/2018 | Yücer | H04N 13/106 |
| 2018/0315221 | A1* | 11/2018 | Jones | G06F 18/22 |
| 2019/0130602 | A1* | 5/2019 | Hall | G06T 7/74 |
| 2019/0204084 | A1 | 7/2019 | Song et al. | |
| 2019/0248487 | A1* | 8/2019 | Holtz | G06V 20/17 |
| 2021/0001776 | A1* | 1/2021 | Kim | B60R 1/002 |
| 2023/0039129 | A1* | 2/2023 | Ruppel | G01C 21/183 |
| 2023/0281872 | A1* | 9/2023 | Peng | G06T 7/246 |
| | | | | 382/154 |

FOREIGN PATENT DOCUMENTS

| | | | |
|---|---|---|---|
| CN | 110044354 A | 7/2019 | |
| CN | 110125928 A | 8/2019 | |
| CN | 110319772 A | 10/2019 | |
| CN | 111307146 A | 6/2020 | |
| CN | 112233177 A | 1/2021 | |
| CN | 112304307 A | 2/2021 | |
| CN | 112484725 A | 3/2021 | |
| CN | 113237484 A | 8/2021 | |
| CN | 114910069 A | 8/2022 | |
| CN | 115272494 A | 11/2022 | |
| WO | 2021081774 A1 | 5/2021 | |
| WO | 2021184218 A1 | 9/2021 | |

OTHER PUBLICATIONS

Daniel Detone et al., "Superpoint: Self-supervised interest point detection and description." Proceedings of the IEEE conference on computer vision and pattern recognition workshops. 2018. 13 Pages.
Paul-Edouard Sarlin et al. "Superglue: Learning feature matching with graph neural networks." Proceedings of the IEEE/CVF conference on computer vision and pattern recognition. 2020. 18 Pages.
Kaiming He et al. "Mask r-cnn." Proceedings of the IEEE international conference on computer vision. 2017. 9 Pages.
Joan Sola. "Quaternion kinematics for the error-state Kalman filter." arXiv preprint arXiv:1711.02508 (2017). 95 Pages.
Jae-Hak Kim. "Camera Motion Estimation for Multi-Camera Systems." (2008). 197 Pages.
Hee Lee, Gim, et al. "Minimal solutions for pose estimation of a multi-camera system." Robotics Research: The 16th International Symposium ISRR. Springer International Publishing, 2016. 16 Pages.
Boris D Lubachevsky. "The structure of the inverse to the sylvester resultant matrix." Linear Algebra and its Applications 85 (1987): 191-202. 11 Pages.
Ben Lang, "Niantic Launches City-scale Visual Positioning System for Location-based, Multi-user AR", https://www.roadtovr.com/niantic-launch-lightship-visual-positioning-system-vps-this-month/, May 24, 2022. 5 Pages.
Reinhardt, Tilman. "Using Global Localization to Improve Navigation." Google AI Blog (2019). https://ai.googleblog.com/2019/02/using-global-localization-to-improve.html 7 Pages.
FangLai, "Triangulate with linear triangulation", https://www.cnblogs.com/FangLai-you/p/11276148.html, 2019. 6 Pages (including translation).
Haichuan, "That thing about triangulation", https://zhuanlan.zhihu.com/p/527512442, Jun. 15, 2022. 14 Pages (including translation).
Machine Vision 011, "Understanding and solving homography matrices", https://blog.csdn.net/liubing8609/article/details/85340015, Dec. 29, 2018. 21 Pages (including translation).
Mr Qin, "An article explaining epipolar constraints, essential matrices, and homography matrices", https://www.guyuehome.com/34324, Jun. 24, 2021. 19 Pages (including translation).
Jiang Ren, "Detailed explanation of BA", https://jiangren.work/2019/08/17/%E8%AF%A6%E8%A7%A3BA/, Aug. 17, 2019. 19 Pages (including translation).
Merlion Gold Medal Lecturer, "Detailed explanation of RANSAC algorithm (with Python fitting straight line model code)", https://zhuanlan.zhihu.com/p/62238520, Apr. 13, 2019. 11 Pages (including translation).
Banbao, "Introduction to Plucker Coordinates", https://banbao991.github.io/2021/10/07/Math/PI%C3%BCcker-Coordinates/, Oct. 7, 2021. 8 Pages (including translation).
ExreLin, "Unusual coordinate system—Plucker coordinates", https://extrelin.github.io/2018/05/10/plucker-coordinates/, May 10, 2018. 11 Pages (including translation).
Kokerf, "Fundamental matrix, essential matrix and homography matrix"—CSDN Blog, May 15, 2017. 8 Pages.
The World Intellectual Property Organization (WIPO) International Search Report for PCT/CN2023/114477 Oct. 24, 2023 7 Pages (including translation).
The State Intellectual Property Office of the People's Republic of China (SIPO) Office Action 1 for 202211194949.0 Nov. 11, 2022 17 Pages (including translation).
Xuan Su. Visual inertial odometer system based on IMU pre-integration. "China Excellent Master's degree Thesis Full text Database (Information Science and Technology Series)" No. 12, Dec. 15, 2018, p. I140-741.
The European Patent Office (EPO), The Extended European Search Report for Application No. 23861666.8, Feb. 28, 2025, 12 Pages.
Changdi Li et al., "Large-scale, real-time 3D scene reconstruction using visual and IMU sensors." IEEE Sensors Journal 20.10 (2020): 5597-5605.
Igor Cvisic et al., "Stereo odometry based on careful feature selection and tracking." 2015 European Conference on Mobile Robots (ECMR). IEEE, 2015.
Zhifang Yang et al., "Research on Indoor Navigation Algorithm Based on Multi-sensor Fusion." Automation and Instrument (2021).

* cited by examiner

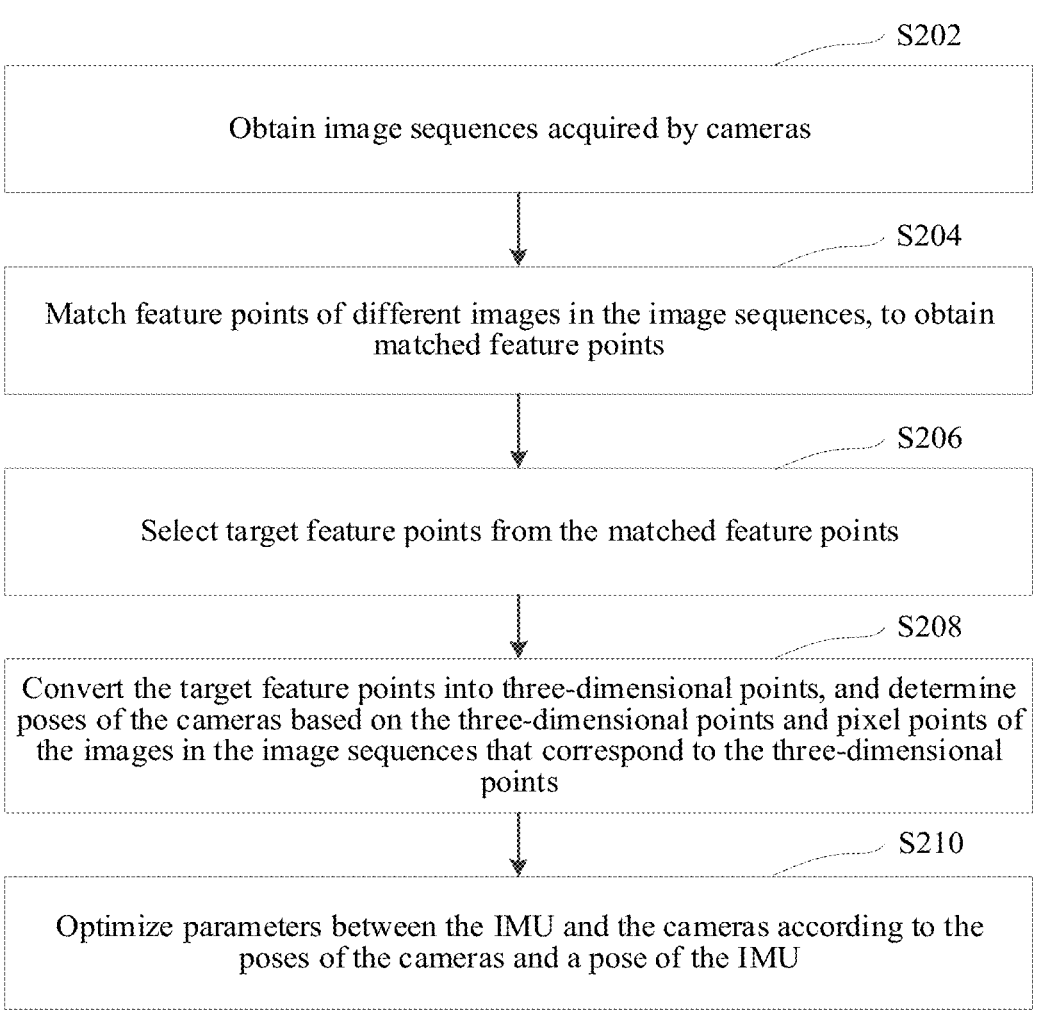

S202

Obtain image sequences acquired by cameras

S204

Match feature points of different images in the image sequences, to obtain matched feature points

S206

Select target feature points from the matched feature points

S208

Convert the target feature points into three-dimensional points, and determine poses of the cameras based on the three-dimensional points and pixel points of the images in the image sequences that correspond to the three-dimensional points

S210

Optimize parameters between the IMU and the cameras according to the poses of the cameras and a pose of the IMU

FIG. 2

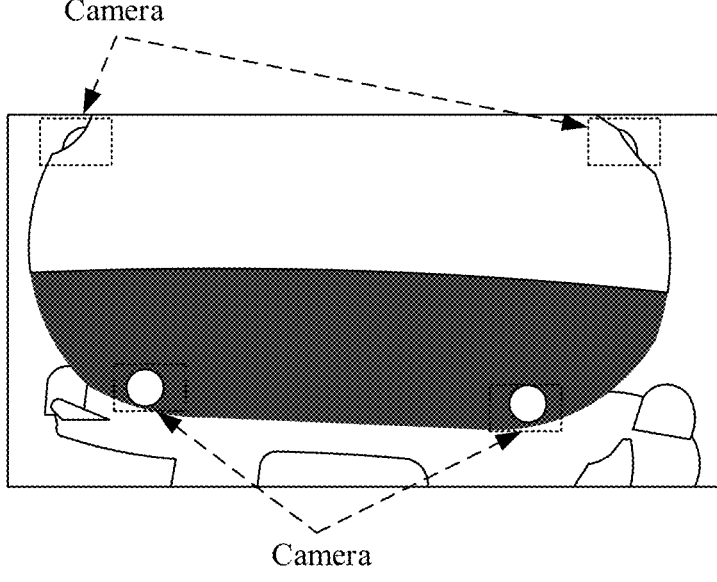

Camera

Camera

FIG. 3a (a)

Road sign (b)

Road sign

Extract the feature points from the images in the image sequences — 1002

Perform intra-frame matching on the feature points of different images in the image sequences, to obtain the first matched points — 1004

Perform inter-frame matching on the feature points of different images in the image sequences, to obtain the second matched points — 1006

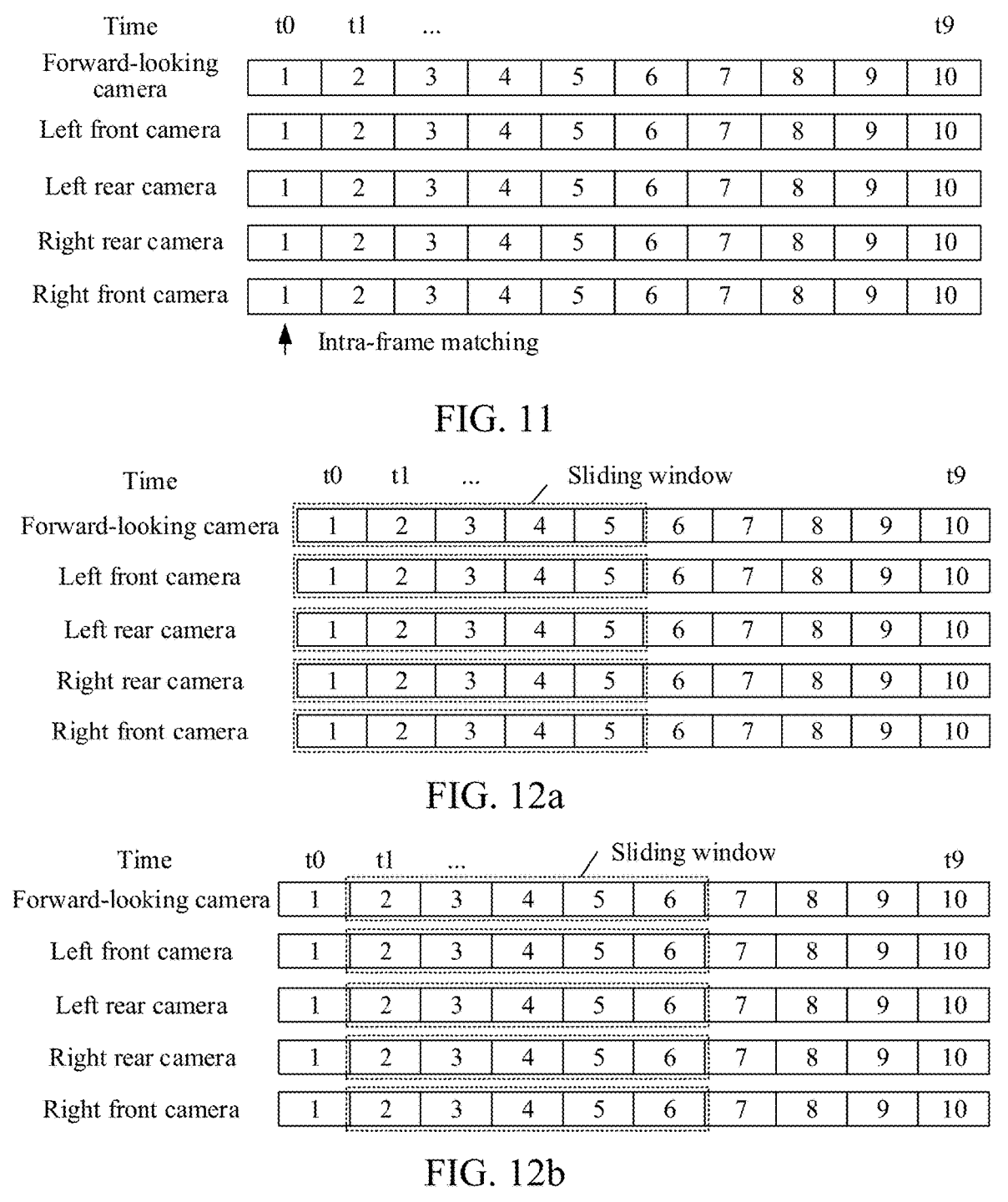

| Time | t0 | t1 | ... | | | | | | | t9 |
|---|---|---|---|---|---|---|---|---|---|---|
| Forward-looking camera | 1 | 2 | 3 | 4 | 5 | 6 | 7 | 8 | 9 | 10 |
| Left front camera | 1 | 2 | 3 | 4 | 5 | 6 | 7 | 8 | 9 | 10 |
| Left rear camera | 1 | 2 | 3 | 4 | 5 | 6 | 7 | 8 | 9 | 10 |
| Right rear camera | 1 | 2 | 3 | 4 | 5 | 6 | 7 | 8 | 9 | 10 |
| Right front camera | 1 | 2 | 3 | 4 | 5 | 6 | 7 | 8 | 9 | 10 |

↑ Intra-frame matching

FIG. 11

| Time | t0 | t1 | ... | | Sliding window | | | | | t9 |
|---|---|---|---|---|---|---|---|---|---|---|
| Forward-looking camera | 1 | 2 | 3 | 4 | 5 | 6 | 7 | 8 | 9 | 10 |
| Left front camera | 1 | 2 | 3 | 4 | 5 | 6 | 7 | 8 | 9 | 10 |
| Left rear camera | 1 | 2 | 3 | 4 | 5 | 6 | 7 | 8 | 9 | 10 |
| Right rear camera | 1 | 2 | 3 | 4 | 5 | 6 | 7 | 8 | 9 | 10 |
| Right front camera | 1 | 2 | 3 | 4 | 5 | 6 | 7 | 8 | 9 | 10 |

FIG. 12a

| Time | t0 | t1 | ... | | | Sliding window | | | | t9 |
|---|---|---|---|---|---|---|---|---|---|---|
| Forward-looking camera | 1 | 2 | 3 | 4 | 5 | 6 | 7 | 8 | 9 | 10 |
| Left front camera | 1 | 2 | 3 | 4 | 5 | 6 | 7 | 8 | 9 | 10 |
| Left rear camera | 1 | 2 | 3 | 4 | 5 | 6 | 7 | 8 | 9 | 10 |
| Right rear camera | 1 | 2 | 3 | 4 | 5 | 6 | 7 | 8 | 9 | 10 |
| Right front camera | 1 | 2 | 3 | 4 | 5 | 6 | 7 | 8 | 9 | 10 |

| Constants | Real value | Variable symbol | Error value | Composition | Measurement | Noise |
|---|---|---|---|---|---|---|
| Full state | $x_t$ | x | $\delta x$ | $x_t = x \oplus \delta x$ | | |
| Position information | $p_t$ | p | $\delta p$ | $p_t = p + \delta p$ | | |
| Speed | $v_t$ | v | $\delta v$ | $v_t = v + \delta v$ | | |
| Rotation quadruple | $q_t$ | q | $\delta q$ | $q_t = q \otimes \delta q$ | | |
| Rotation matrix | $R_t$ | R | $\delta R$ | $R_t = R\delta R$ | | |
| Vector angle | | | $\delta\theta$ | $\delta q = e^{\delta\theta/2}$ $\delta R = e^{[\delta\theta]\times}$ | | |
| Acceleration offset | $a_{bt}$ | $a_b$ | $\delta a_b$ | $a_{bt} = a_b + \delta a_b$ | | $a_w$ |
| Rotation offset | $\omega_{bt}$ | $\omega_b$ | $\delta\omega_b$ | $\omega_{bt} = \omega_b + \delta\omega_b$ | | $\omega_w$ |
| Gravity vector | $g_t$ | g | $\delta g$ | $g_t = g + \delta g$ | | |
| Acceleration | $a_t$ | | | | $a_t$ | $a_n$ |
| Angular velocity | $\omega_t$ | | | | $\omega_m$ | $\omega_n$ |

FIG. 15

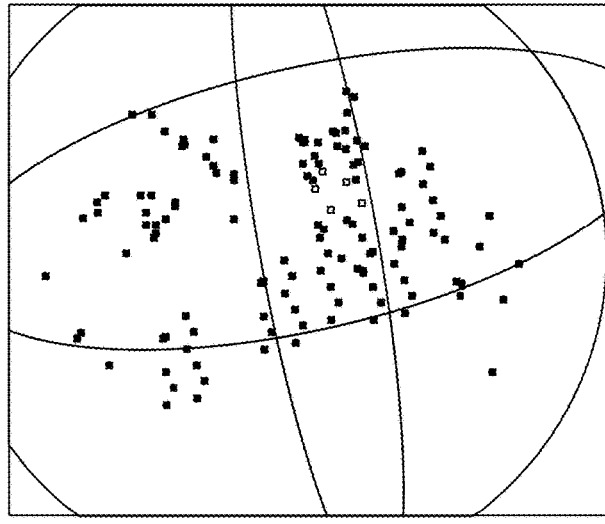

FIG. 16

METHOD AND APPARATUS FOR CALIBRATING CAMERA AND INERTIAL MEASUREMENT UNIT, AND COMPUTER DEVICE

CROSS-REFERENCES TO RELATED APPLICATIONS

This application is a continuation application of PCT Patent Application No. PCT/CN2023/114477, filed on Aug. 23, 2023, which claims priority to Chinese Patent Application No. 2022111949490, filed with the China National Intellectual Property Administration on Sep. 29, 2022, and entitled "METHOD AND APPARATUS FOR CALIBRATING CAMERA AND INERTIAL MEASUREMENT UNIT, AND COMPUTER DEVICE", both of which are incorporated herein by reference in their entirety.

FIELD OF THE TECHNOLOGY

The present disclosure relates to the field of online calibration technologies, and in particular, to a method and apparatus for calibrating a camera and an inertial measurement unit (IMU), and a computer device.

BACKGROUND OF THE DISCLOSURE

Relative position and attitude data between a camera and an IMU of a visual and inertial integrated navigation system are indispensable and important information. Because the camera and the IMU are respectively mounted at different positions of a carrier platform, it is difficult to accurately reflect the relative position and attitude transformation relationship therebetween with only the structural design data of the carrier platform. As such, the camera and the IMU need to be calibrated. In a calibration solution, online calibration is usually performed on a single camera and the IMU. For example, online calibration is performed on a forward-looking camera and the IMU. This calibration solution often has low accuracy.

SUMMARY

According to various embodiments of the present disclosure, a method and apparatus for calibrating a camera and an IMU, and a computer device are provided.

According to a first aspect, the present disclosure provides a method for calibrating a camera and an IMU, performed by a computer device, the method including:

obtaining image sequences acquired by cameras;

matching feature points of different images in the image sequences, to obtain matched feature points;

selecting target feature points from the matched feature points;

converting the target feature points into three-dimensional points, and determining poses of the cameras based on the three-dimensional points and pixel points of the images in the image sequences that correspond to the three-dimensional points; and optimizing parameters between an IMU and the cameras according to the poses of the cameras and a pose of the IMU.

According to a second aspect, the present disclosure further provides an apparatus for calibrating a camera and an IMU. The apparatus includes:

an obtaining module, configured to obtain image sequences acquired by cameras;

a matching module, configured to match feature points of different images in the image sequences, to obtain matched feature points;

a filtering module, configured to filter the matched feature points to obtain target feature points (e.g., select target feature points from the matched feature points);

a processing module, configured to convert the target feature points into three-dimensional points, and determining poses of the cameras based on the three-dimensional points and pixel points of the images in the image sequences that correspond to the three-dimensional points; and an optimization module, configured to optimize rotation parameters and scale change factors between an IMU and the cameras according to the poses of the cameras and a pose of the IMU.

According to a third aspect, the present disclosure further provides a computer device. The computer device includes a memory and a processor, the memory storing a computer program, the processor, when executing the computer program, implementing the following steps:

obtaining image sequences acquired by cameras;

matching feature points of different images in the image sequences, to obtain matched feature points;

selecting target feature points from the matched feature points;

converting the target feature points into three-dimensional points, and determining poses of the cameras based on the three-dimensional points and pixel points of the images in the image sequences that correspond to the three-dimensional points; and optimizing parameters between an IMU and the cameras according to the poses of the cameras and a pose of the IMU.

According to a fourth aspect, the present disclosure further provides a computer-readable storage medium. The computer-readable storage medium storing a computer program, the computer program, when executed by a processor, implementing the following steps:

obtaining image sequences acquired by cameras;

matching feature points of different images in the image sequences, to obtain matched feature points;

selecting target feature points from the matched feature points;

converting the target feature points into three-dimensional points, and determining poses of the cameras based on the three-dimensional points and pixel points of the images in the image sequences that correspond to the three-dimensional points; and optimizing parameters between an IMU and the cameras according to the poses of the cameras and a pose of the IMU.

According to a fifth aspect, the present disclosure further provides a computer program product. The computer program product includes a computer program, the computer program, when executed by a processor, implementing the following steps:

obtaining image sequences acquired by cameras;

matching feature points of different images in the image sequences, to obtain matched feature points;

selecting target feature points from the matched feature points;

converting the target feature points into three-dimensional points, and determining poses of the cameras based on the three-dimensional points and pixel points of the images in the image sequences that correspond to the three-dimensional points; and

optimizing parameters between an IMU and the cameras according to the poses of the cameras and a pose of the IMU.

Details of one or more embodiments of the present disclosure are provided in the subsequent accompanying drawings and descriptions. Other features and advantages of the present disclosure become clearer from the specification, the accompanying drawings, and the claims.

BRIEF DESCRIPTION OF THE DRAWINGS

FIG. 2 is a schematic flowchart of a method for calibrating a camera and an IMU according to an embodiment.

FIG. 3a is a schematic diagram of a virtual reality device or an extended reality device on which a plurality of cameras are mounted according to an embodiment.

FIG. 11 is a schematic diagram of performing intra-frame matching according to another embodiment.

FIG. 12a is a schematic diagram of performing inter-frame matching according to another embodiment.

FIG. 12b is a schematic diagram of performing inter-frame matching according to another embodiment.

FIG. 15 is a schematic diagram of preintegration constants according to an embodiment.

FIG. 16 is a schematic diagram of displaying three-dimensional points on a map according to an embodiment.

4

Figure 22:
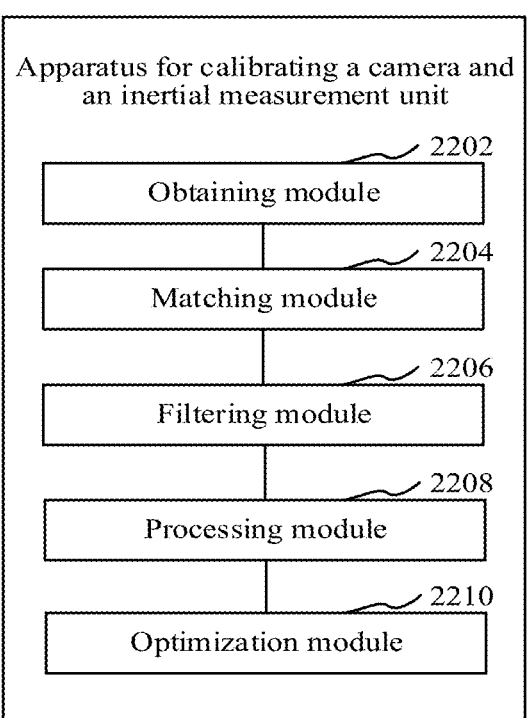

FIG. 22 is a structural block diagram of an apparatus for calibrating a camera and an IMU according to an embodiment.

Figure 23:
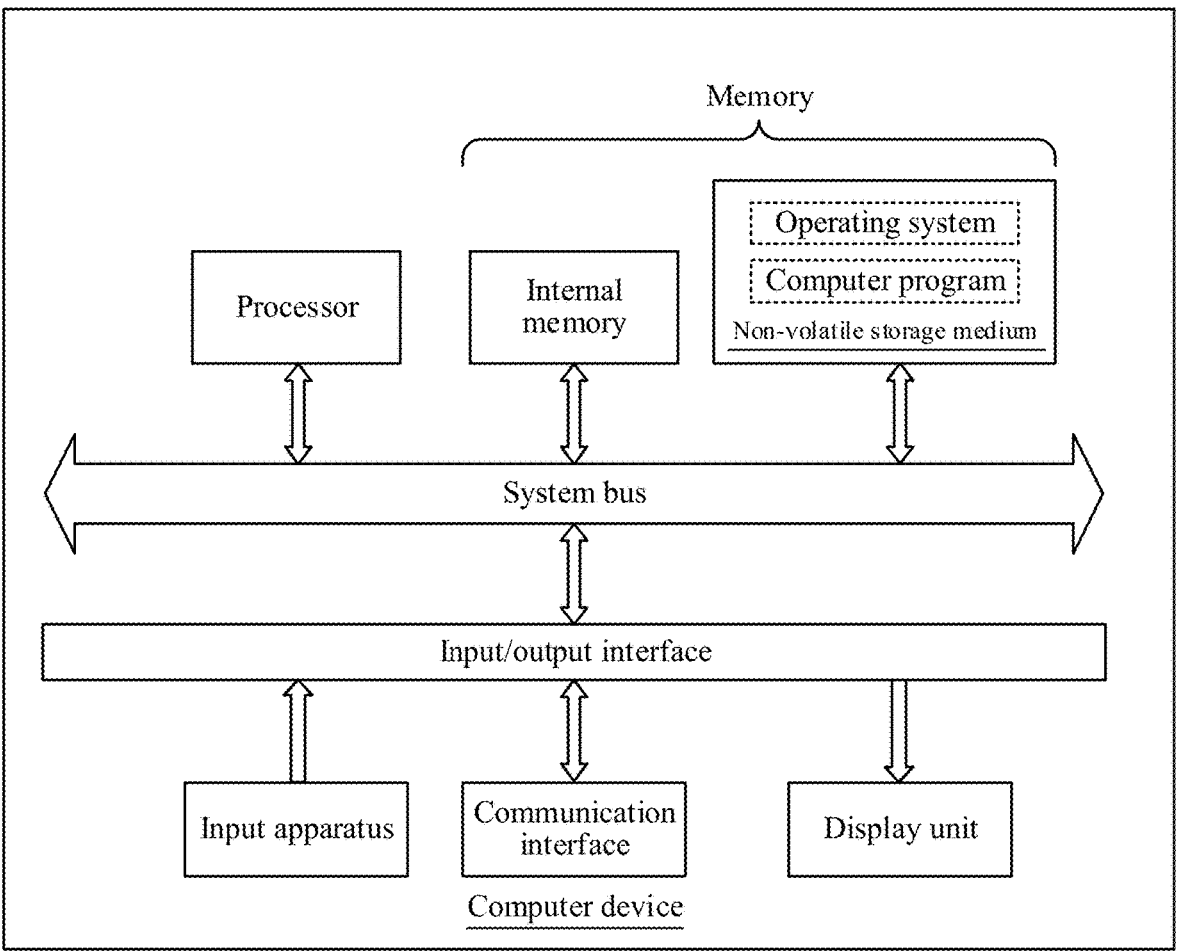

FIG. 23 is a diagram of an internal structure of a computer device according to an embodiment.

DESCRIPTION OF EMBODIMENTS

To make the objectives, technical solutions, and advantages of the present disclosure clearer, the following further describes the present disclosure in detail with reference to the accompanying drawings and the embodiments. It is to be understood that the specific embodiments described herein are only used for explaining the present disclosure, and are not used for limiting the present disclosure.

Figure 1:
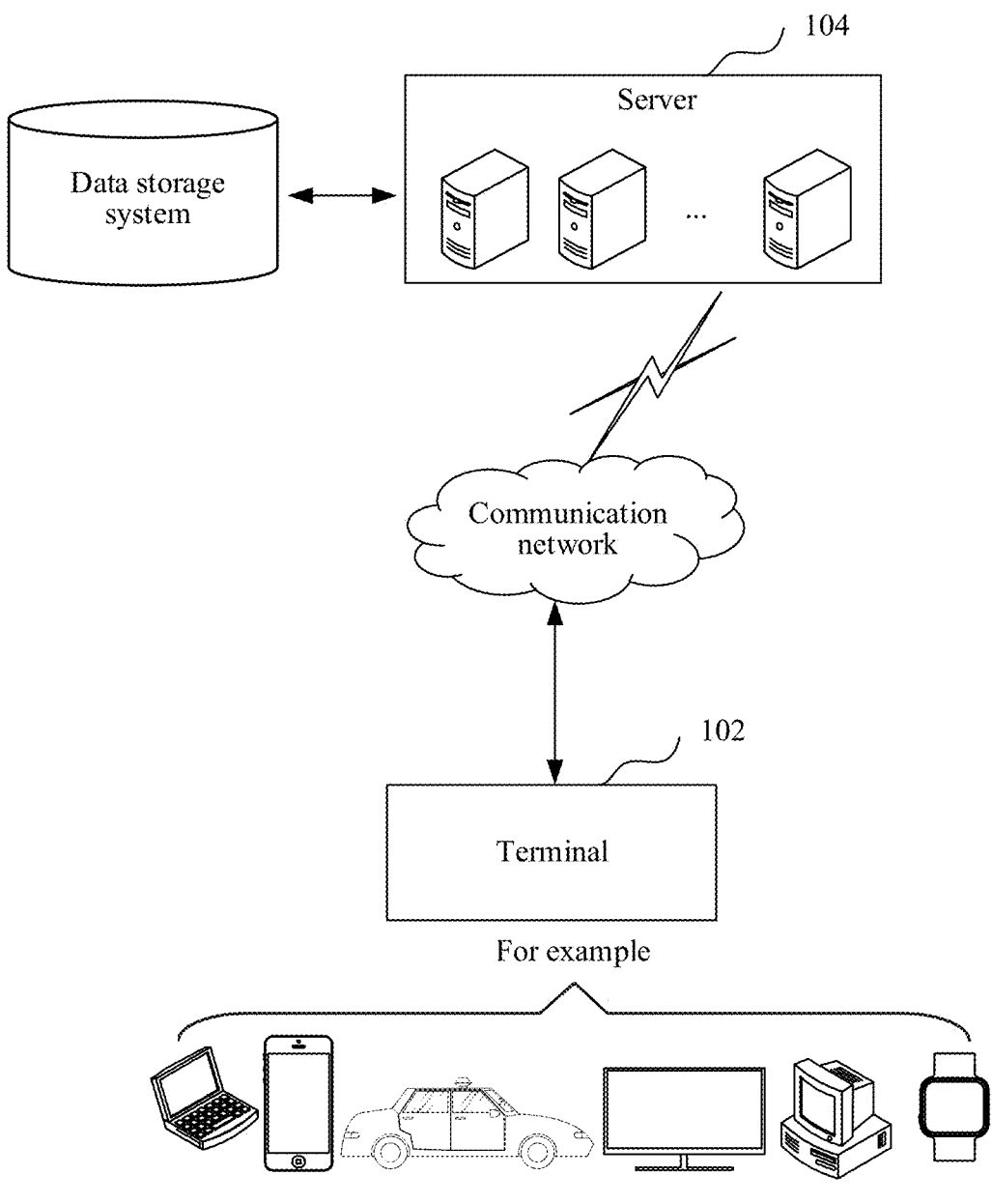
FIG. 1 is a diagram of an application environment of a method for calibrating a camera and an IMU according to an embodiment.

A method for calibrating a camera and an IMU provided in the embodiments of the present disclosure may be applied to an application environment shown in FIG. 1. A terminal 102 communicates with a server 104 through a network. A data storage system may store data that needs to be processed by the server 104. The data storage system may be integrated on the server 104, or placed on the cloud or another network server. The terminal 102 obtains image sequences acquired by cameras; matches feature points of different images in the image sequences, to obtain matched feature points; filters the matched feature points based on a relationship matrix of the cameras, to obtain target feature points, the relationship matrix being determined based on extrinsic parameters of the cameras and a preintegrated pose of an IMU; converts the target feature points into three-dimensional points, and determines poses of the cameras based on the three-dimensional points and pixel points of target images in the image sequences that correspond to the target feature points; and optimizes parameters between the IMU and the cameras according to the poses of the cameras and the pose of the IMU. Alternatively, after obtaining the image sequences acquired by the cameras on a vehicle, the terminal 102 transmits these image sequences to the server 104, and the server 104 performs the foregoing calibration process.

The terminal 102 may be the vehicle driven by a user or a smart in-vehicle device on the vehicle, or a smartphone, a tablet computer, a notebook computer, a desktop computer, a smart watch, an Internet of Things device, and a portable wearable device used by the user. The portable wearable device may be a smart watch, a smart bracelet, a head-mounted device, or the like. In addition, the terminal 102 may alternatively be a virtual reality device or an extended reality device, or a controller on a virtual reality device or an extended reality device.

The server 104 may be an independent physical server or a service node in the blockchain system. Service nodes in the blockchain system form a peer-to-peer (P2P) network therebetween. The P2P protocol is an application-layer protocol running over the transmission control protocol (TCP) protocol.

In addition, the server 104 may alternatively be a server cluster formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

The terminal 102 and the server 104 may be connected in a communication connection manner such as Bluetooth, a universal serial bus (USB), or a network, which is not limited in the present disclosure.

In an embodiment, as shown in FIG. 2, a method for calibrating a camera and an IMU is provided. The method may be applied to the server or terminal in FIG. 1. A description is provided below by using an example in which the method is applied to the terminal in FIG. 1. The method includes the following steps:

S202: Obtain image sequences acquired by cameras.

Figure 3B:
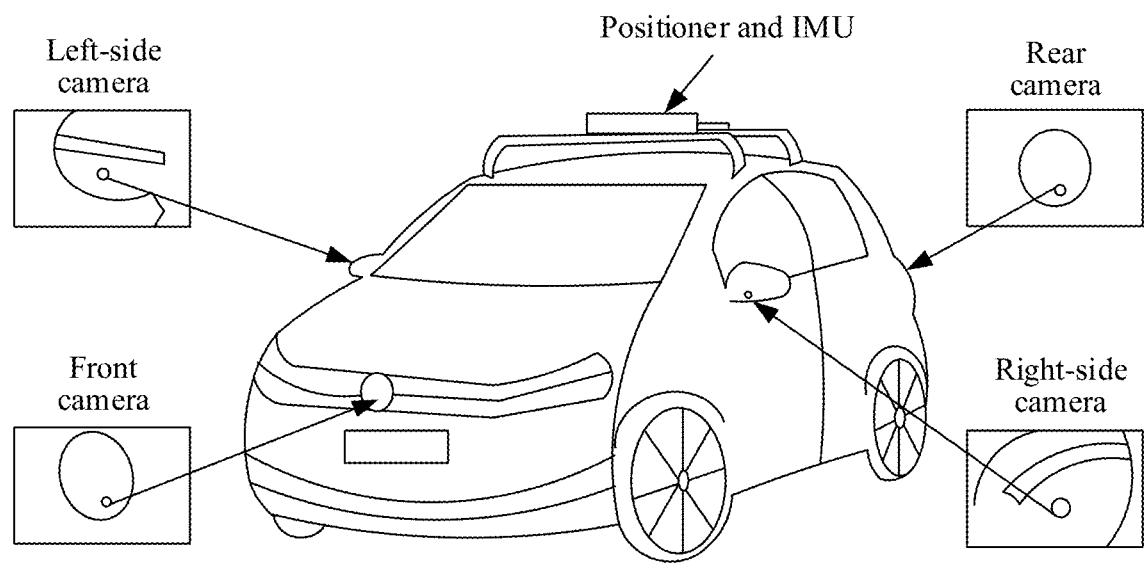
FIG. 3b is a schematic diagram of a vehicle on which a plurality of cameras and an IMU are mounted according to an embodiment.

The foregoing cameras (that is, cameras) may be mounted at different orientations of a vehicle, and these cameras may be connected in a rigid connection (which is also referred to as rigid body connection) manner. Alternatively, the foregoing cameras may alternatively be mounted at different orientations of a virtual reality device or an extended reality device. For example, the cameras are mounted at the upper left, lower left, upper right, and lower right positions of the virtual reality device or extended reality device, as shown in FIG. 3*a*. Because the cameras may be mounted on a vehicle, a virtual reality device, or an extended reality device, the calibration method in the present disclosure may be applied to a scenario of calibrating cameras and an IMU on a vehicle, as well as to a scenario of calibrating cameras and an IMU on a virtual reality device or an extended reality device. The cameras may be connected through rigid bodies, and there may be some common viewing regions therebetween. A generalized camera model that may be formed by combination of these cameras is shown in FIG. 3*b*.

The extended reality device may be an electronic device that integrates three technologies: virtual reality (VR), augmented reality (AR), and mixed reality (MR).

An image sequence is an ordered image set formed by a plurality of images acquired at different time points. For example, images acquired by each camera on a vehicle may form an image sequence. In another example, images acquired by each camera on a virtual reality device or an extended reality device may also form an image sequence. Each camera has a corresponding image sequence, and image sequences of different cameras include images acquired at the same time point and at different time points.

In an embodiment, the terminal obtains image sequences acquired by cameras on the vehicle, or obtains image sequences acquired by cameras on a virtual reality device or an extended reality device.

The vehicle may refer to a motor vehicle driven by a user, such as a motor vehicle driven manually by the user or a motor vehicle driven automatically through an automatic driving system. A plurality of cameras may be mounted on the vehicle. At least one camera may be mounted on each of the front, left side, right side, and rear of the vehicle. As shown in FIG. 3*b*, a camera is mounted at the logo position in the front of the vehicle, a camera is mounted at each of the left view mirror and the right view mirror of the vehicle, and a camera may also be mounted at the logo position in the rear of the vehicle. The front camera may acquire images of the front of the vehicle, the left-side camera may acquire images of the left front of the vehicle, the right-side camera may acquire images of the right front of the vehicle, and the rear camera may acquire images of the rear of the vehicle.

Figure 4:
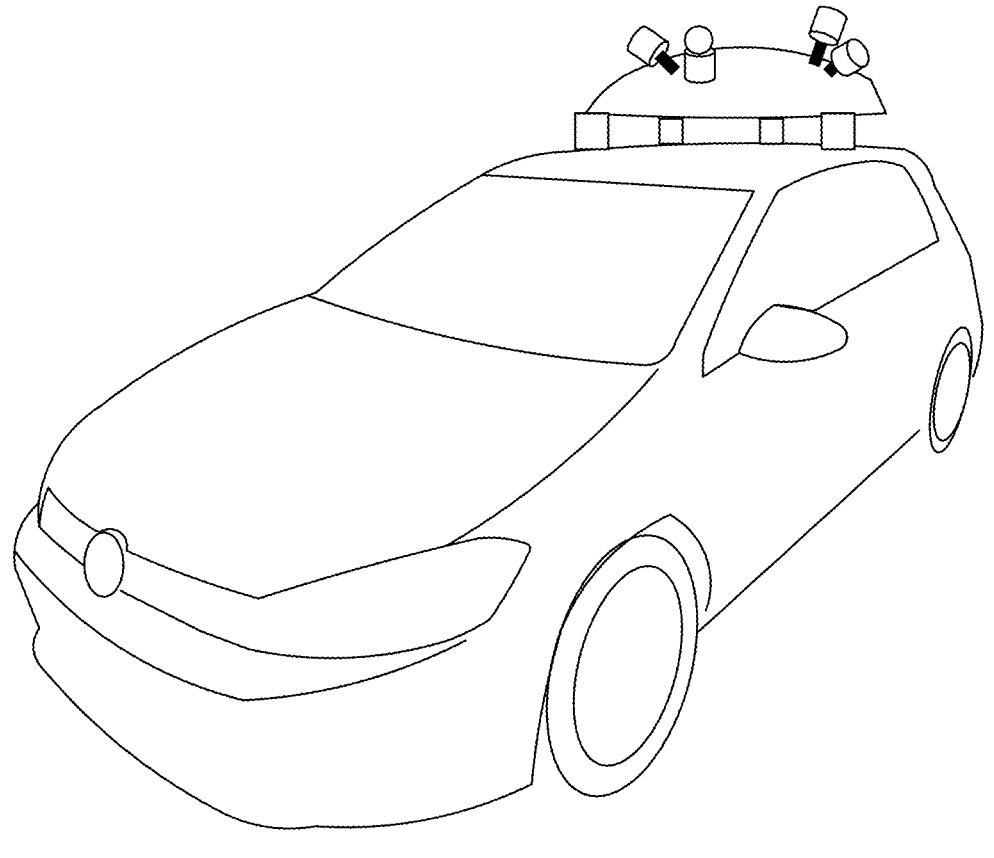
FIG. 4 is a schematic diagram of a vehicle on which a plurality of cameras and an IMU are mounted according to another embodiment.
Figure 5:
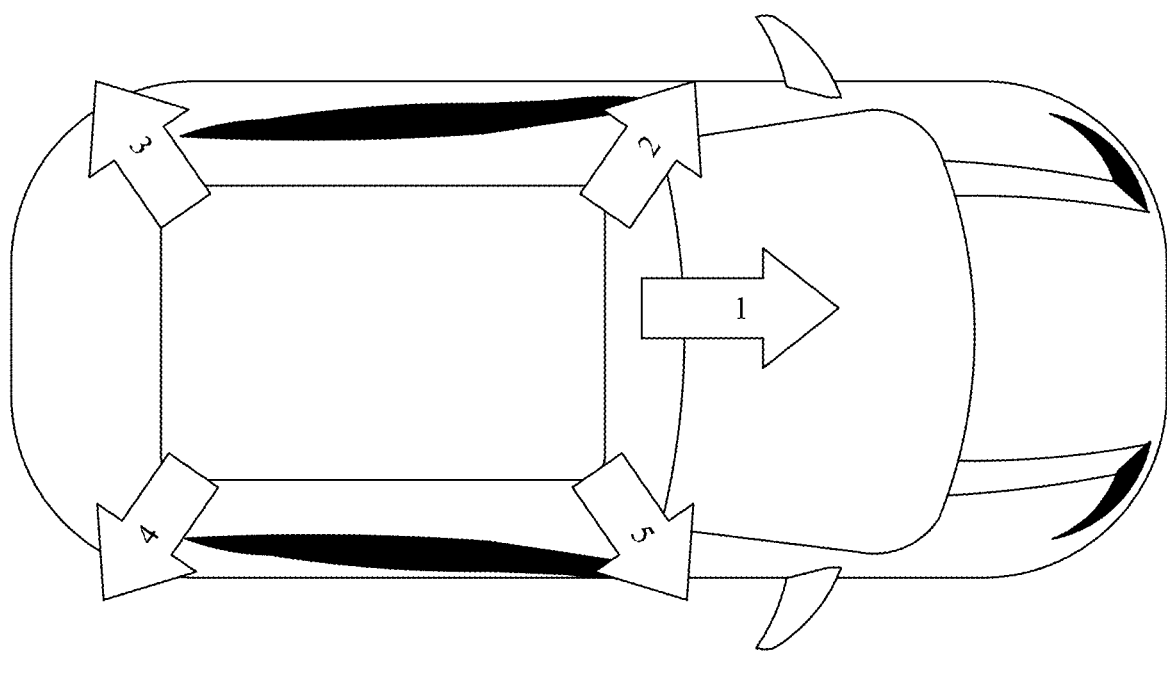
FIG. 5 is a schematic diagram of mounting orientations of cameras on a vehicle according to an embodiment.

In addition, cameras may also be mounted in other places of the vehicle. As shown in FIG. 4, a set of in-vehicle cameras is externally mounted on the roof of the vehicle. This set of in-vehicle cameras may be formed by five cameras. The included angle of each camera is about 72 degrees, and there is an elevation angle of about 20 degrees upward. The cameras are connected by rigid bodies. The layout orientation of each camera is shown in FIG. 5. Each arrow represents an orientation of each camera. The front camera of the vehicle is parallel to the traveling direction of the vehicle. Cameras 1 to 5 represent a forward-looking camera, a left front camera, a left rear camera, a right rear camera, and a right front camera respectively.

In an embodiment, after acquiring images in real time, the cameras transmit the images acquired in real time to the terminal. The terminal arranges the images acquired in real time by the cameras in sequence to obtain image sequences of the cameras. In order to meet real-time requirements, the terminal may perform S204 in the process of receiving the images; or after the cameras acquire images within a target period to obtain image sequences, the image sequences acquired by the cameras are then transmitted to the terminal, and then S204 is performed.

For example, as shown in FIG. 4, during traveling of the vehicle, the forward-looking camera, the left front camera, the left rear camera, the right rear camera, and the right front camera of the vehicle acquire images in real time, and then transmit the images acquired in real time to the terminal, and the terminal combines the images acquired by each camera, to obtain the image sequences within the target period. Alternatively, after the forward-looking camera, the left front camera, the left rear camera, the right rear camera, and the right front camera of the vehicle acquire the image sequences within the target period, these image sequences are transmitted to the terminal.

S204: Match feature points of different images in the image sequences, to obtain matched feature points.

Figure 6:
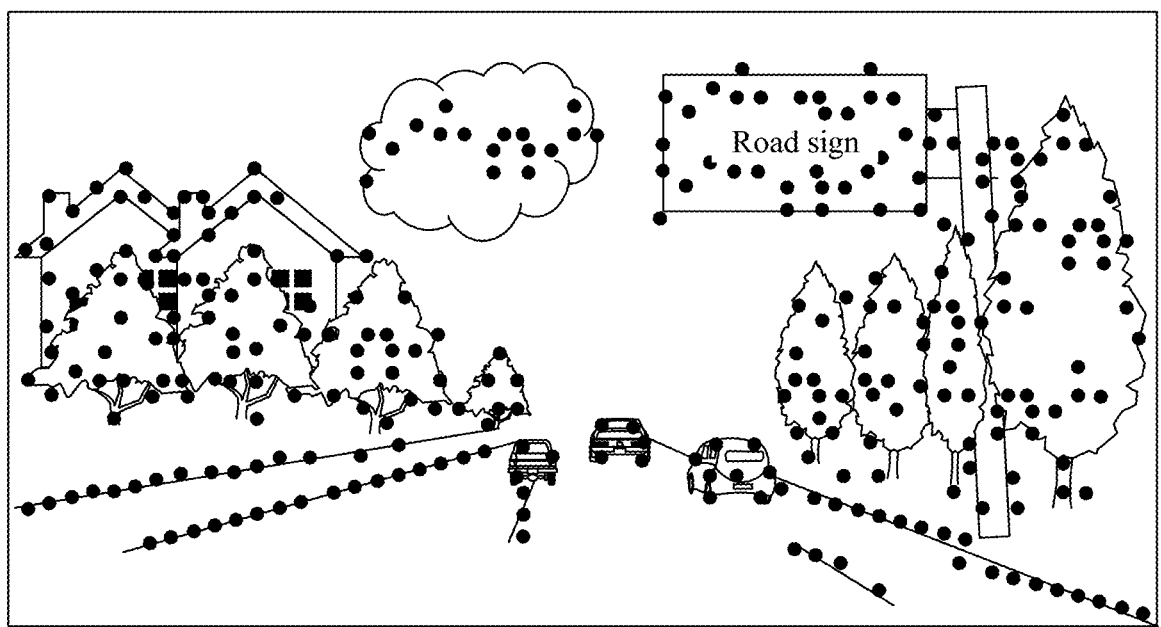
FIG. 6 is a schematic diagram of feature points detected in an image according to an embodiment.

Feature points may refer to pixel points related to a target object in an image, and reference may be made to FIG. 6. When the calibration method in the present disclosure is applied to the scenario of calibrating cameras and an IMU on a vehicle, the target object may be a representative object. For example, the target object may include a building, a tree, a traffic signal pole, a traffic sign, and other objects on two sides of a road on which the vehicle is traveling. In addition, the target object may also include a road and a pedestrian and a vehicle on the road. When the calibration method in the present disclosure is applied to the scenario of calibrating cameras and an IMU on a virtual reality device or an extended reality device, the target object may be a static object, such as a TV, a sofa, and other static markers indoor.

The matched feature points may refer to feature points matching each other in different images. For example, feature points a(1) to a(n) in an image 1 match each other and feature points b(1) to b(n) in an image 2 match each other, then the feature points a(1) to a(n) and the feature points b(1) to b(n) are matched feature points.

In an embodiment, during matching, the terminal may use the superglue feature point matching algorithm, other matching algorithms based on deep learning, or the SIFT algorithm to match the feature points of different images in the image sequences.

In another embodiment, the terminal may perform intra-frame matching and inter-frame matching on the feature points of different images in the image sequences to obtain first matched points and second matched points respectively, the first matched points and the second matched points being matched feature points. During inter-frame matching, the terminal may use a sliding window algorithm to perform inter-frame matching on the feature points of different images in the image sequences.

Figure 7:
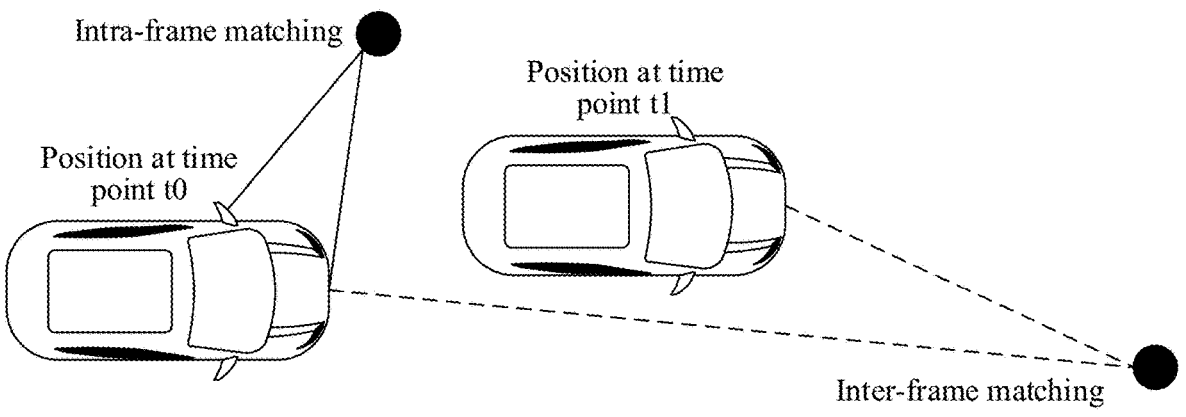
FIG. 7 is a schematic diagram of inter-frame matching and intra-frame matching according to an embodiment.
Figure 8:
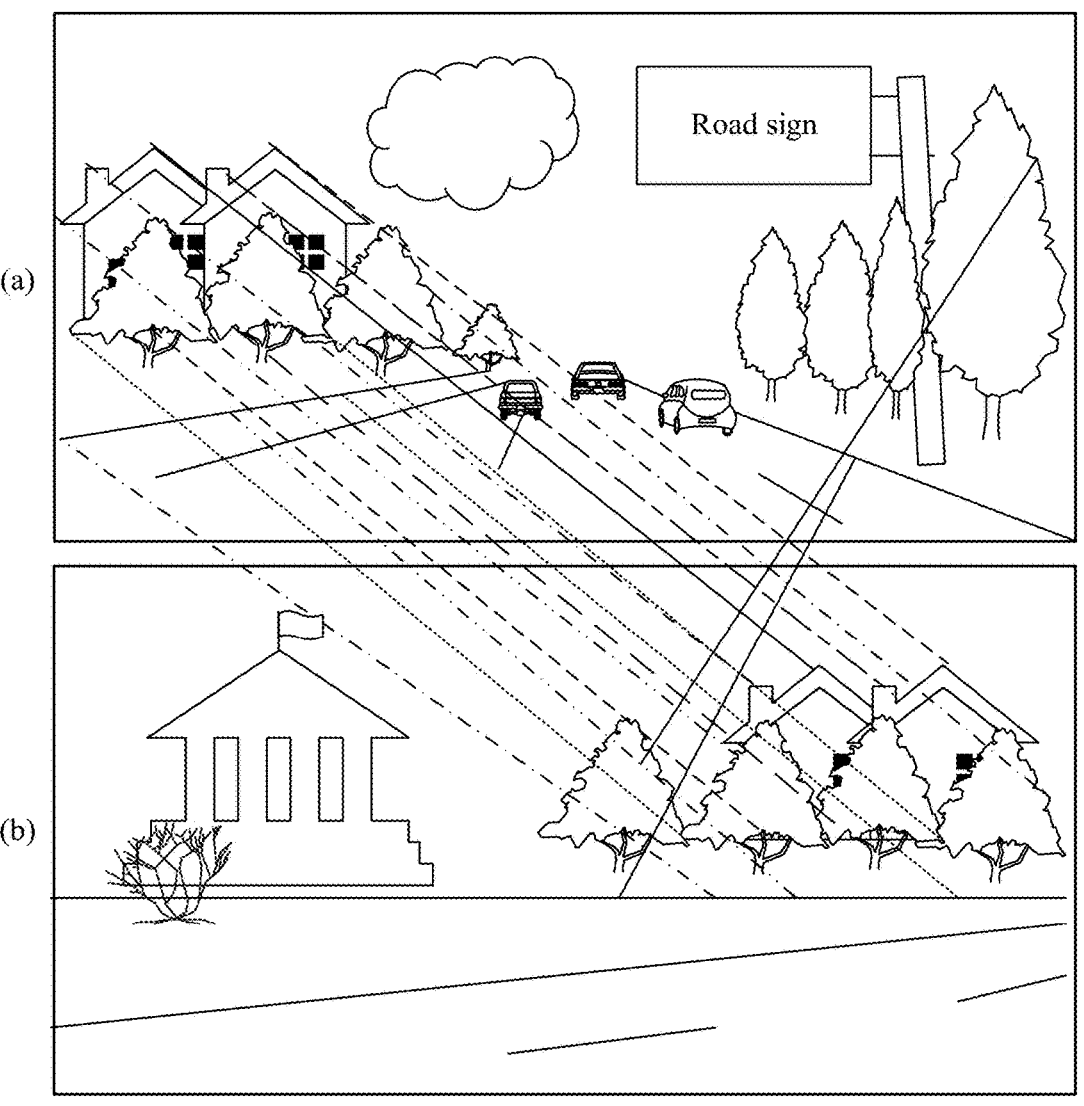
FIG. 8 is a schematic diagram of performing intra-frame matching according to an embodiment.

Intra-frame matching may refer to matching feature points in images acquired at the same time point by different rigidly connected cameras, such as matching feature points in images acquired at the same time point in the image sequences. For example, as shown in FIG. 7, feature points in images acquired by the left front camera and the forward-looking camera at a time point t0 are matched. This matching process belongs to intra-frame matching, and first matched points are obtained. For the first matched points, reference may be made to FIG. 8. The image (a) of FIG. 8 is an image acquired by the forward-looking camera at the time point to, the image (b) of FIG. 8 is an image acquired by the left front camera at the time point t0, and points at two ends of lines in the image (a) and the image (b) of FIG. 8 are first matched points.

Figures 9, 10:
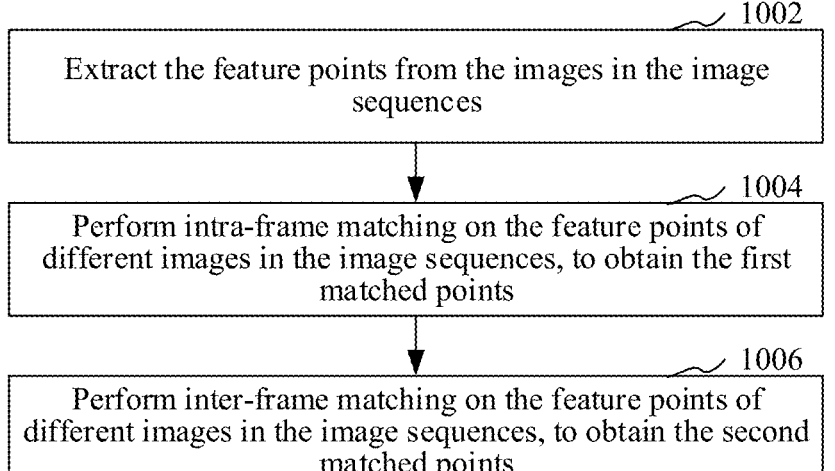
FIG. 9 is a schematic diagram of performing inter-frame matching according to an embodiment.
FIG. 10 is a schematic flowchart of performing inter-frame matching and intra-frame matching on different images according to an embodiment.

Inter-frame matching may refer to performing feature matching on feature points in images acquired at different time points by the rigidly connected cameras, such as using a sliding-window algorithm matching feature points in images acquired at different time points in the image sequences. For example, as shown in FIG. 7, feature points in images acquired by the forward-looking camera at the time point t0 and a time point t1 are matched. This matching process belongs to inter-frame matching, and second matched points are obtained. For the second matched points, reference may be made to FIG. 9. The image (a) of FIG. 9 is an image acquired by the forward-looking camera at the time point t0, the image (b) of FIG. 9 is an image acquired by the forward-looking camera at the time point t1, and points at two ends of lines in the image (a) and the image (b) of FIG. 9 are second matched points.

The sliding window algorithm may be operated on a specific quantity of images instead of the entire image sequence, which reduces the computational complexity, thereby reducing the loop nesting depth.

In an embodiment, before S204, when the cameras are mounted at different orientations of the vehicle, the terminal performs target detection on the images in the image sequences to obtain a target object; and masks, in the images in the image sequences, regions in which the target object is located, where feature points in the masked regions do not participate in matching, which can improve the accuracy of matching. The target object may be a road surface and a dynamic obstacle on the road, and the dynamic obstacle may be a vehicle and a pedestrian.

Because there are many repetitive textures and dynamic obstacles on the road, the accuracy of feature point matching is affected, consequently affecting the accuracy of calibration. In order to improve the accuracy of matching and calibration, the road surface and the dynamic obstacle may be detected and segmented, and after the influence of the road surface and the dynamic obstacle is eliminated, feature points are then matched. The specific operation process is as follows: when the cameras are mounted at different orientations of the vehicle, the terminal performs target detection on the images in the image sequences to obtain a road surface and a dynamic obstacle; and masks the road surface and the dynamic obstacle in the images in the image sequences, that is, masks regions in which the road surface is located and regions in which the dynamic obstacle is located; and then matches feature points of different images in the image sequences that are within unoccluded regions.

A model for detection and segmentation may be a network model that integrates object detection and instance segmentation. After detecting the target object, the network model masks the target object, and feature points in masked regions do not participate in the matching. The network model may be a mask region based convolutional neural network (Mask RCNN) or another segmentation model based on deep learning.

S206: Filter the matched feature points to obtain target feature points (e.g., select target feature points from the matched feature points).

In an embodiment, the terminal may filter the matched feature points based on the relationship matrix of the cameras, to obtain the target feature points. There may be a plurality of obtained target feature points. Specifically, the terminal determines an epipolar line corresponding to a relationship matrix of the cameras in the images; determines distance values from the matched feature points to the epipolar line; and filters out matched feature points corresponding to distance values greater than a distance threshold, to obtain the target feature points. When determining the epipolar line, the terminal may calculate the epipolar line corresponding to the relationship matrix based on the pre-integrated pose of the IMU, and then draw the epipolar line on each image.

The relationship matrix of the cameras may be a G matrix of a generalized camera model, which is a special essential matrix. The generalized camera model is a model formed by cameras connected through rigid bodies. In addition, the relationship matrix may be determined based on extrinsic parameters of the cameras and the preintegrated pose of the IMU, which can reflect a transformation relationship of an image point of a three-dimensional point P in the space in the camera coordinate system under different viewing angle cameras. The expression thereof is as follows:

$$G = \begin{bmatrix} [t]_x R & R \\ R & 0 \end{bmatrix}$$

The IMU may be mounted on the vehicle. For the mounting position, reference may be made to the position shown in FIG. 3b. In addition, the IMU may alternatively be mounted at other positions. The IMU is non-rigidly connected to the cameras on the vehicle. In addition to being mounted on a vehicle, the IMU may alternatively be mounted on a virtual reality device or an extended reality device. The IMU may also be non-rigidly connected to and the cameras on the virtual reality device or the extended reality device. Preintegration may refer to that: in a case that state variables (attitude information, speed, position information) of the IMU at a previous time point are known, the speed and angular velocity measured by the IMU are used to perform an integral operation to obtain state variables at the current time point, such as position information and attitude information.

In an embodiment, because the images acquired by the cameras carry noise, the matched feature points contain noise points (which are also referred to as external points). In this case, the terminal performs external point filtering on the matched feature points based on the relationship matrix of the cameras, to reduce the external points in the matched feature points, thereby obtaining the target feature points.

S208: Convert the target feature points into three-dimensional points, and determine poses of the cameras based on the three-dimensional points and pixel points of the images in the image sequences that correspond to the three-dimensional points.

The pose of the camera may include position information and attitude information of the camera. The attitude information may include a pitch angle for rotating around the X-axis, a yaw angle for rotating around the Y-axis, and a roll angle for rotating around the Z-axis. In addition, the attitude information may alternatively be represented by a rotation quadruple.

The pixel points corresponding to the three-dimensional points may be feature points in the images that correspond to the three-dimensional points. Correspondingly, the image in each image sequence may be an image on which the feature points corresponding to the three-dimensional points are located. For example, pixel points corresponding to three-dimensional points a to e are located on an image 1 and an image 2 in the image sequence, then the image 1 and the image 2 are target images. Generally, each three-dimensional point may be a spatial point corresponding to pixel points in two or more images, so that each three-dimensional point may correspond to pixel points in two or more images.

In an embodiment, the terminal triangulates the target feature points by using intrinsic parameters of the cameras and/or extrinsic parameters of the cameras, to obtain the three-dimensional points corresponding to the target feature points. Each three-dimensional point corresponds to pixel points of at least two target images in the image sequence. For example, the pixel points of the at least two target images are points of the three-dimensional point in the images. The intrinsic parameters of the cameras include focal lengths of the cameras, principal point positions, and the like; and the extrinsic parameters of the cameras include positions and orientations of the cameras.

After obtaining a three-dimensional point, the terminal selects an image corresponding to the three-dimensional point in each image sequence, converts coordinates of the $i^{th}$ frame of image in the image sequence into coordinate estimated values of the $(i+1)^{th}$ frame of image through an initial transformation matrix, then converts the coordinate estimated values of the $(i+1)^{th}$ frame of image into pixel coordinates based on intrinsic parameters, and uses an error function to make a difference between the pixel coordinates and coordinates of a pixel point corresponding to the three-dimensional point in the $(i+1)^{th}$ frame of image. By optimizing the error function, an optimal transformation matrix can be calculated step by step, and the calculated transformation matrix can be used as a pose of the camera. i is a positive integer greater than or equal to 1.

In an embodiment, after obtaining the three-dimensional points, the terminal may alternatively continue to perform external point filtering on these three-dimensional points, such as using multi-camera perspective-n-point (PnP) and a random sample consensus (Ransac) algorithm to filter out the external points, and the initial poses of the cameras are solved during filtering of the external points. Subsequently, bundle adjustment (BA) optimization is performed based on the calculated interior points (that is, the three-dimensional points obtained after the exterior points are filtered out), that is, the poses of the cameras are optimized by minimizing a reprojection error. The external points may be three-dimensional points formed due to noise among all three-dimensional points, which are points that do not actually exist in the real world.

For the method for external point filtering, the following details may include: the terminal selects to-be-processed three-dimensional points from these three-dimensional points; determines positions and directions of the cameras based on the to-be-processed three-dimensional points and feature points corresponding to the to-be-processed three-dimensional points; determines reprojection errors between other three-dimensional points in the three-dimensional points and feature points corresponding to the other three-dimensional points according to the positions and the directions; and uses three-dimensional points with reprojection errors less than or equal to an error threshold in the three-dimensional points as three-dimensional interior points, thereby selecting the target three-dimensional points.

S210: Optimize parameters between an IMU and the cameras according to the poses of the cameras and a pose of the IMU.

The pose of the camera may be position information and attitude information in a camera coordinate system. The pose of the IMU may be position information and attitude information in an IMU coordinate system. The parameters between the IMU and the cameras may include a rotation extrinsic parameter and a scale factor.

In an embodiment, in the optimization process, the terminal first aligns poses of the cameras within the sliding window with the pose of the IMU, and then optimizes the parameters between the IMU and the cameras by using the aligned poses. Aligning may refer to temporally aligning the positions and the attitudes of the cameras with the position and the attitude of the IMU. In the alignment process, the sliding window may be moved over time.

Because the parameters may include the rotation extrinsic parameter and the scale factor, and the poses of the cameras includes the poses within the sliding window, S210 may specifically include the following steps: aligning, by the terminal, the poses within the sliding window with the pose of the IMU; and optimizing rotation parameters and scale change factors between the IMU and the cameras based on the aligned poses.

Specifically, after aligning the poses of the cameras with the pose of the IMU, the terminal analyzes the poses of the cameras and the pose of the IMU, to obtain a pose relationship between the cameras and the IMU. Based on this pose relationship, the rotation parameters and the scale change factors between the IMU and the cameras may be optimized. The expression of the pose relationship is as follows:

$$y = \min\|\|\lambda(R \times P1 + t) - P2\|$$

where \lambda represents the scale factor between the cameras and the IMU, R represents the rotation extrinsic parameter (that is, a rotation matrix), P1 represents poses of the cameras, t represents translation parameters between the cameras and the IMU, and P2 may be the pose of the IMU. The translation parameter comes from the factory value.

According to the foregoing expression, the terminal may minimize the pose relationship by optimizing the scale factor and the rotation extrinsic parameter, thereby obtaining the final scale factor and the final rotation extrinsic parameter.

In addition to optimizing the parameters between the IMU and the cameras, the terminal may also optimize the translation parameters between the IMU and the cameras. The specific optimization process is as follows: the terminal performs reprojection based on the three-dimensional points and the poses of the cameras, to obtain reprojection points; obtains an error function based on the target feature points and the reprojection points; solves the error function, and optimizes the translation parameters between the IMU and the cameras based on a solution result of the error function.

For example, due to the noise of an observation point, there is an error between the reprojection point and the target feature point. In order to determine the optimal translation parameter, a least square function is constructed in advance, and coordinates of the reprojection point and the target feature point are substituted into the least square function. The least square function substituted into the parameters is used as an error function. The error function is as follows:

$$y = \operatorname{argmin} \frac{1}{2} \sum_{i=1}^{n} \left\| u_i - \frac{1}{S_i} KTP_i \right\|_2^2$$

where ui may refer to coordinates of the target feature point, and $KTP_i/S_i$ may refer to coordinates of the reprojection point.

The error function is solved, and then the solution result is used to optimize the translation parameters between the IMU and the cameras. During solving of this error function, a Gauss-Newton method or a Levenberg-Marquardt method may be used for solving.

In the foregoing embodiments, after obtaining the image sequences acquired by the cameras, the feature points of different images in the image sequences are matched, to effectively avoid relatively large position deviations when the target feature points in the matched feature points are triangulated to obtain the three-dimensional points, thereby helping to improve the position accuracy and robustness of the three-dimensional points. In addition, the matched feature points are further filtered based on the relationship matrix of the cameras, thereby reducing or avoiding the interference of noise points. By converting the filtered target feature points into three-dimensional points, and based on the three-dimensional point, corresponding pixel points, and an extrinsic parameter constraint condition between the cameras, the poses of the cameras can be accurately calculated. Finally, the parameters between the IMU and the cameras are optimized according to the poses of the cameras and the pose of the IMU, thereby effectively improving the accuracy of parameter calibration.

In an embodiment, as shown in FIG. 10, S204 may specifically include the following steps:

S1002: Extract the feature points from the images in the image sequences.

Steps for extracting the feature points may specifically include: The terminal may use a scale-invariant feature transform (SIFT) method, a feature point detection model based on deep learning, or a SuperPoint algorithm to extract feature points in the images in the image sequences. For the extracted feature points, reference may be made to FIG. 6.

SIFT is a method used for detecting and describing local features in images, through which an extreme point in the spatial scale can be searched for, and a position, a scale, and a rotation invariant thereof can be extracted. In addition, SIFT may also be used for matching feature points. The SuperPoint algorithm is a self-supervised feature point detection algorithm based on deep learning.

S1004: Perform intra-frame matching on the feature points of different images in the image sequences, to obtain the first matched points.

Intra-frame matching may refer to matching feature points in images acquired at the same time point by different rigidly connected cameras. For example, as shown in FIG. 6, the process of matching feature points in images acquired by the left front camera and the forward-looking camera at the time point t0 belongs to intra-frame matching. In addition, the process of matching the feature points in images acquired by the forward-looking camera and the right front camera at the time point t0 also belongs to intra-frame matching.

Steps for intra-frame matching may specifically include: determining, by the terminal, images acquired at the same time point in the image sequences; and performing feature matching on feature points corresponding to the images acquired at the same time point, to obtain the first matched points.

For example, it is assumed that there are 10 images in an image sequence acquired by each of the forward-looking camera, the left front camera, the left rear camera, the right rear camera, and the right front camera. As shown in FIG. 11, the image sequence of each camera contains the first image to the tenth image, and these images are reacquired by each camera at time points t0 to t9 respectively. The terminal determines, from each image sequence, the images acquired by the forward-looking camera, the left front camera, the left rear camera, the right rear camera, and the right front camera at the time points t0 to t9 respectively, thereby obtaining the images acquired by the cameras at the same time points. Subsequently, feature matching is performed on the feature points in the images acquired by the cameras at t0, that is, feature matching is performed on the feature points in the first images acquired by the forward-looking camera, the left front camera, the left rear camera, the right rear camera, and the right front camera; then feature matching is performed on the feature points in the images acquired by the cameras at the time point t1, and so on, until feature matching is performed on the feature points in the images acquired by the cameras at the time point t9, thereby obtaining the first matched points of intra-frame matching.

S1006: Perform inter-frame matching on the feature points of different images in the image sequences, to obtain the second matched points.

The first matched points and second matched points belong to matched feature points.

Inter-frame matching may refer to matching feature points in images acquired by rigidly connected cameras at different time points. For example, as shown in FIG. 6, the process of matching feature points in the images acquired by the forward-looking camera at the time points t0 and t1 belongs to inter-frame matching; in addition, the process of matching feature points in the images acquired by the forward-looking camera and the right front camera at the time points t0 and t1 respectively also belongs to inter-frame matching.

In an embodiment, steps for inter-frame matching may specifically include: aligning, by the terminal, the images in the image sequences, and then placing a sliding window at starting positions of the aligned image sequences as shown in FIG. 12a; and matching feature points of images acquired at a target time point in the sliding window and feature points of images acquired at other time points in the sliding window, and moving, after the matching is completed, the sliding window to continue inter-frame matching, that is, continue inter-frame matching in the foregoing matching manner, until inter-frame matching between feature points of images acquired at each target time point in the image sequences is completed, to obtain the second matched points.

The sliding window may be a time window with a certain length. The length may be fixed. After the feature points in the images within the sliding window are matched, the sliding window is moved according to a preset stride length, and then feature points in the images within the moved sliding window continue to be matched.

For example, it is assumed that there are 10 images in an image sequence acquired by each of the forward-looking camera, the left front camera, the left rear camera, the right rear camera, and the right front camera. As shown in FIG. 12a, the image sequence of each camera contains the first image to the tenth image, and these images are reacquired by each camera at time points t0 to t9 respectively. The terminal places a sliding window with a window length of 5 on each image sequence, then matches feature points of the fifth image of each camera in the sliding window with feature points of other images in the sliding window, and moves the sliding window after the matching is completed. As shown in FIG. 12*b*, the terminal subsequently matches feature points of the sixth image of each camera in the sliding window with feature points of other images in the sliding window, until the inter-frame matching between the feature points of the images acquired at each target time point in each image sequence is completed, thereby obtaining the second matched points.

By matching the feature points of different images in the image sequences acquired by different cameras, the accuracy of the three-dimensional points can be improved during triangulation calculation of three-dimensional points. For example, in some solutions, feature points in images acquired by a monocular camera (such as the forward-looking camera) are usually matched to obtain matched feature points. During triangulation calculation, because most of the feature points are relatively small acute angles, and according to the following expression, it can be seen that very small disturbances may cause relatively large deviations in the calculated position, resulting in relatively low accuracy of the calculated three-dimensional points. However, by using the foregoing matching manner provided in the present disclosure, the accuracy of the three-dimensional points can be greatly improved.

$$\frac{a}{sinA} = \frac{b}{sinB}$$

When an angle A is close to 0 degrees, the sine value is relatively small, and a very small disturbance may cause a relatively large deviation in the calculated position, so that the accuracy of the three-dimensional points calculated by using the above-described solution is low. Through the solution of performing feature point matching on images acquired by the cameras in the present disclosure, the accuracy of the three-dimensional points can be improved during triangulation calibration of the three-dimensional points, which helps to improve the calibration accuracy.

In an embodiment, S206 may specifically include: determining, by the terminal, an epipolar line corresponding to a relationship matrix of the cameras in the images; determining distance values from the matched feature points to the epipolar line; and filtering out (e.g., removing) matched feature points corresponding to distance values greater than a distance threshold, to obtain the target feature points. In each image, there may be a plurality of epipolar lines corresponding to the relationship matrix.

When determining the epipolar line, the terminal may calculate the epipolar line corresponding to the relationship matrix based on the preintegrated pose of the IMU, and then draw the epipolar line on each image. In each image, a distance value between the matched feature point in the image and the epipolar line is calculated, and a target feature point can be obtained by performing filtering according to the distance value.

Figure 13:
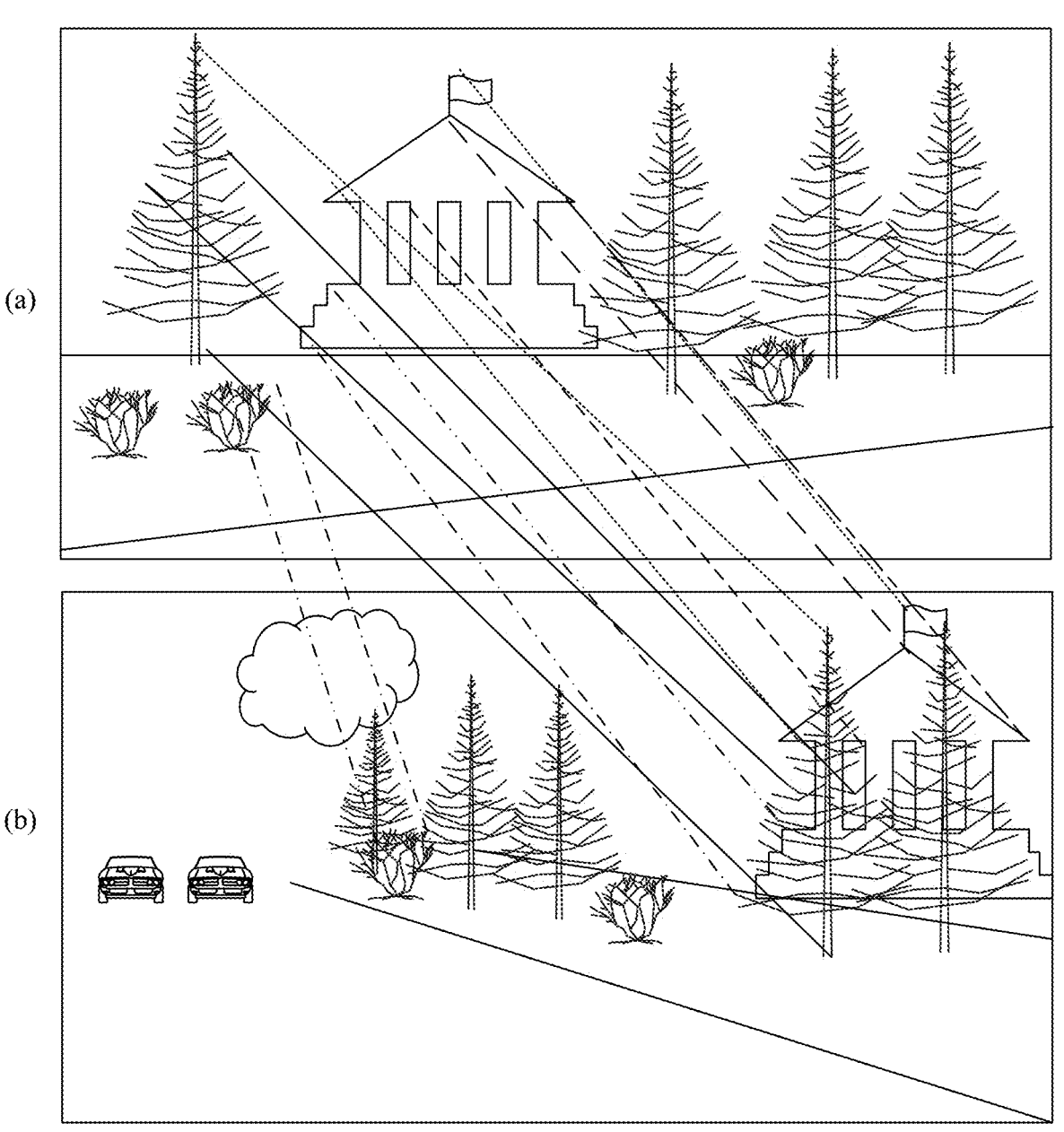
FIG. 13 is a schematic diagram of filtering matched feature points according to an embodiment.
Figure 14:
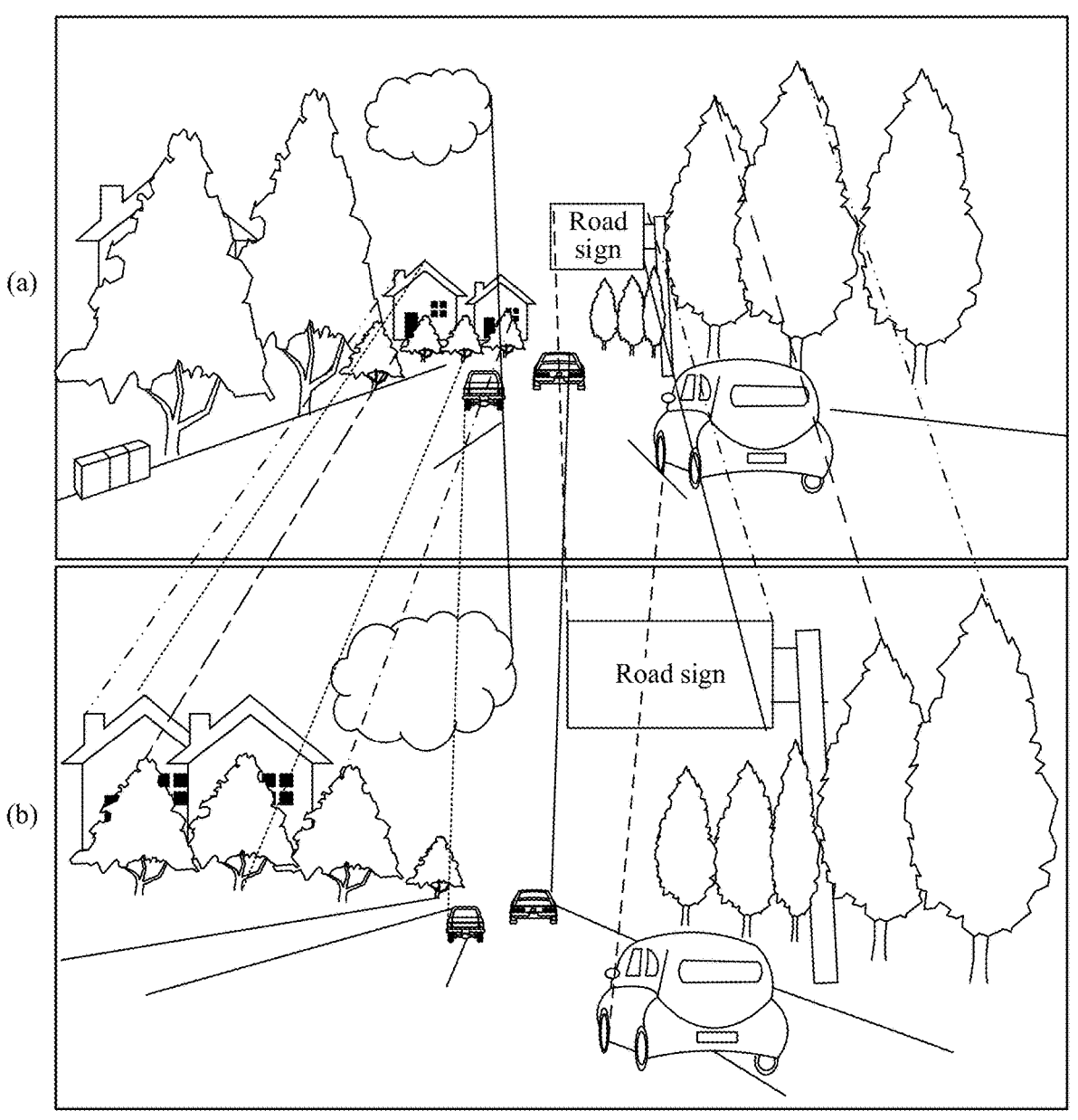
FIG. 14 is a schematic diagram of filtering matched feature points according to another embodiment.

For example, a description may be made with reference to FIG. 8, FIG. 9, FIG. 13, and FIG. 14, where:

In FIG. 8 and FIG. 9, there are a small quantity of noise points in the matched feature points. The terminal filters the matched feature points in FIG. 8 and FIG. 9 in the foregoing filtering manner, thereby effectively reducing the quantity of noise points and obtaining the target feature points shown in FIG. 13 and FIG. 14 respectively. The image (a) in FIG. 13 may be an image acquired by the left front camera at the time point t0, and the image (b) in FIG. 13 may be an image acquired by the left rear camera at the time point t0. The points connected by the lines in the images (a) and (b) of FIG. 13 are the target feature points obtained after filtering, and it can be seen from FIG. 13 that the noise points are obviously reduced. The images (a) and (b) of FIG. 14 may be images acquired by the forward-looking camera at the time points to and t1 respectively, and the points connected by the lines in the images (a) and (b) of FIG. 14 are the target feature points obtained after filtering. It can be seen from FIG. 14 that the noise points are obviously reduced.

In the foregoing embodiments, using the distance values from the matched feature point to the epipolar line to filter the matched feature points can effectively reduce the impact of noise points and further improve the accuracy of calibration.

In an embodiment, the terminal obtains IMU data detected by the IMU; performs preintegration based on the IMU data, to obtain a first preintegration variable and a second preintegration variable; determines attitude information according to the first preintegration variable and initial attitude information of the IMU; determines position information according to the second preintegration variable, initial position information of the IMU, and an initial speed; and uses the position information and the attitude information as a preintegrated pose of the IMU.

The initial position information and the initial speed may refer to the position information and the speed of the vehicle at the last time point.

The IMU data includes a movement speed detected by the IMU (such as the motion speed of the vehicle or the movement speed of the virtual reality device) and an angular velocity detected by a gyroscope (that is, a sensor mounted on the vehicle or virtual reality device). Position information can be obtained by integrating the movement speed, and an angle can be obtained by integrating the angular velocity. The expression of preintegration of the IMU is as follows:

$$p_{t+1} = p_t + v_t \Delta t + \frac{1}{2}(R(a_m - a_b) + g)\Delta t^2$$

$$v_{t+1} = v_t + (R(a_m - a_b) + g)\Delta t$$

$$q_{t+1} = q_t \otimes q((w_t - w_b)\Delta t)$$

where $p_t$ and $p_{t+1}$ represent the position information at time points t and t+1 respectively, $v_t$ and $v_{t+1}$ represent the movement speeds at the time points t and t+1 respectively, and $q_t$ and $q_{t+1}$ represent the rotation quadruples at the time points t and t+1 respectively. The rotation quadruple is a representation form of attitude information. $v_t \Delta t + (R(a_m - a_b) + g)\Delta t^2/2$ may represent the second preintegration variable, which may also referred to as a position integration variable; and $q(w_t - w_b)\Delta t$ may represent the first preintegration variable, which may also referred to as an attitude integration variable. In addition, for constants and descriptions of preintegration, reference may be made to FIG. 15.

In the foregoing embodiments, by preintegrating the IMU data, the relative poses between the two frames of images may finally be obtained, and it is unnecessary to perform integration again for the all, thereby reducing the computational pressure.

In an embodiment, the terminal selects a preset quantity of points from the three-dimensional points as interior points, and determines prediction poses of the cameras based on the interior points and pixel points corresponding to the interior points; and re-selects, in response to that errors between initial poses and the prediction poses of the cameras do not meet an error condition, the preset quantity of points as interior points to determine prediction poses of the cameras, and until the errors between the initial poses and the prediction poses meet the error condition, uses the interior points that are selected and lead to the error condition being met as target three-dimensional points. Therefore, S208 may specifically include: determining the poses of the cameras based on the target three-dimensional points and pixel points of images in the image sequences that correspond to the three-dimensional points.

During selection of interior points, the selection may be performed randomly. The selected interior points may be assumed to be real three-dimensional points. When the error between the calculated prediction pose and the initial pose (belonging to the initial extrinsic parameters) meets a preset error condition, the selected interior points are real three-dimensional points; and when the error does not meet the preset error condition, the selected interior points are not real three-dimensional points, and interior points need to be re-selected until all real three-dimensional points are selected. These real three-dimensional points are used as target three-dimensional points, thereby achieving re-filtering of feature points and further filtering out external points. The foregoing external point filtering manners are generalized camera model PnP and Ransac filtering manners.

Figure 17:
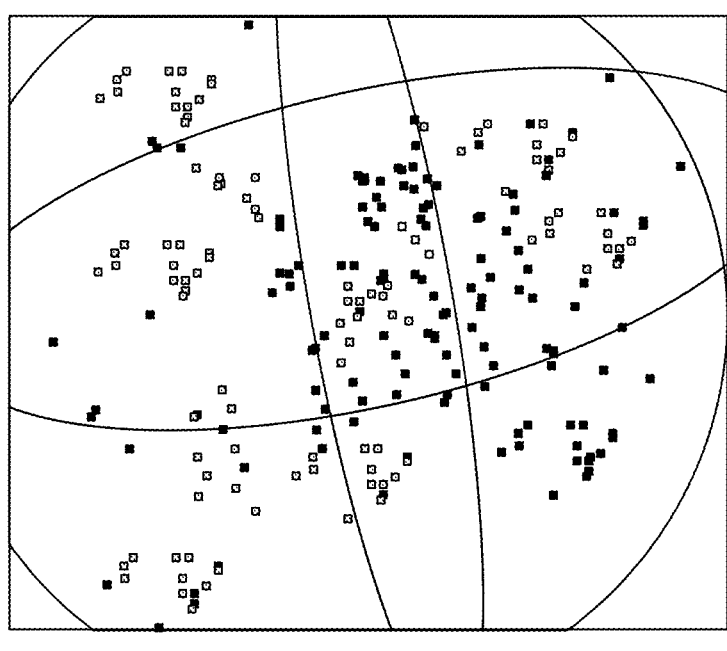
FIG. 17 is a schematic diagram of displaying three-dimensional points on a map according to another embodiment.

In the scenario of calibrating cameras and an IMU on a vehicle, the foregoing three-dimensional points are spatial points obtained by triangulating the matched feature points. The three-dimensional points corresponding to the first two frames of images in the image sequence are added to a map, and the three-dimensional point map data shown in FIG. 16 can be obtained. The rectangular boxes in FIG. 16 represent the positions of the cameras, and the black squares are the coordinates of the three-dimensional points corresponding to the first two frames. Subsequently, external point filtering is performed on the third frame of image in the foregoing filtering manner, then the filtered three-dimensional points and the three-dimensional points corresponding to the first two frames are added to a map, and the three-dimensional point map data shown in FIG. 17 can be obtained. The rectangular boxes in FIG. 17 represent the positions of the cameras, the black squares are the coordinates of the three-dimensional points corresponding to the first two frames, and the gray squares are the coordinates of the three-dimensional points corresponding to the third frame.

Figure 18:
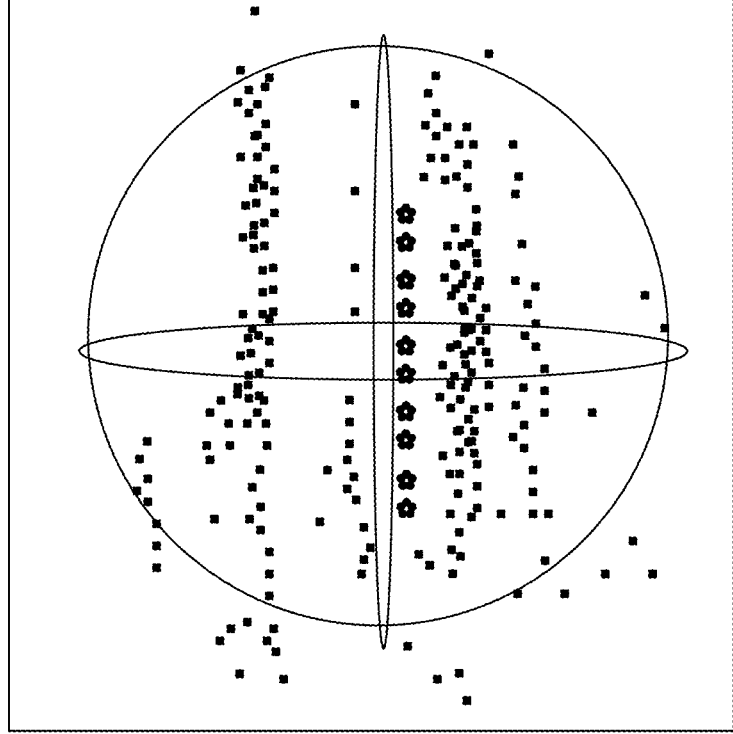
FIG. 18 is a schematic diagram of displaying filtered three-dimensional points on a map according to an embodiment.
Figure 19:
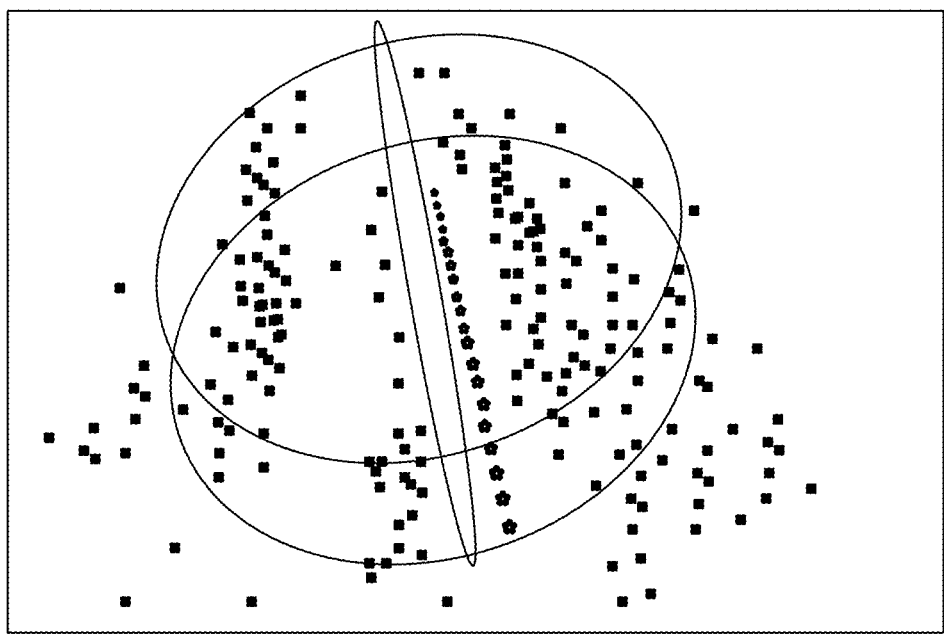
FIG. 19 is a schematic diagram of displaying filtered three-dimensional points on a map according to another embodiment.

In addition, FIG. 18 and FIG. 19 show point cloud effects after the three-dimensional points corresponding to the first 20 frames of images are filtered. FIG. 18 is a top view, and FIG. 19 is a side view. It can be seen that these three-dimensional points are distributed on two sides of the vehicle, and three-dimensional points further away from the vehicle are sparser. The five connected dots in FIG. 18 and FIG. 19 represent five cameras on the vehicle.

In the foregoing embodiments, by filtering three-dimensional points, the impact of mismatching on parameter calibration can be effectively reduced, thereby effectively improving the accuracy of parameter calibration.

For example, a scenario of calibrating extrinsic parameters between cameras and an IMU on a vehicle is used as an example for description, which is specifically as follows:
(1) Perform Feature Point Detection on Images Acquired by the Cameras on the Vehicle.

In the present disclosure, a superpoint extraction manner may be used to extract feature points. In addition, other feature point detection models based on deep learning or other feature point detection algorithms may alternatively be used for feature point detection, to obtain feature points in the images.
(2) Feature Point Matching.

The feature point matching is divided into intra-frame matching and inter-frame matching. Intra-frame matching may refer to matching feature points of images acquired by different cameras at the same time point, and inter-frame matching may refer to matching feature points of images acquired by the same or different cameras at different time points. Because there are many repetitive textures (such as the ground) and dynamic obstacles (such as vehicles and pedestrians) on the road, the ground, pedestrians, and vehicles on the road need to be detected and segmented. Mask RCNN may be used for segmentation, or other segmentation models based on deep learning may be used. Regions in which the ground, pedestrians and vehicles are located that are obtained through segmentation are masked, and the masked regions do not participate in matching.

The policy adopted for intra-frame matching in this embodiment of the present disclosure is that: feature point matching is performed on images between a camera 1 and a camera 2; feature point matching is performed on images between the camera 2 and a camera 3; feature point matching is performed on images between the camera 3 and a camera 4; feature point matching is performed on images between the camera 4 and a camera 5; and feature point matching is performed on images between the camera 5 and the camera 1. The camera 1 may refer to the forward-looking camera, the camera 2 may refer to the left front camera, the camera 3 can refer to the left rear camera, the camera 4 may refer to the right rear camera, and the camera 5 may refer to the right front camera.

The policy adopted for inter-frame matching in this embodiment of the present disclosure is to perform feature point matching on the images acquired by the cameras in the sliding window at a certain time point and all the images in the sliding window, and continuously move the sliding window. At the beginning, feature point matching is performed on the images acquired by all cameras at a time point t5 and the images acquired by the cameras at other time points in the sliding window.
(3) Preintegration.

Through the IMU's gyroscope and wheel speed preintegration, the preintegrated relative pose of the IMU can be obtained. The velocity is integrated to obtain a displacement, and the angular velocity is integrated to obtain an angle. The corresponding formula is as follows:

$$p_{t+1} = p_t + v_t \Delta t + \frac{1}{2}(R(a_m - a_b) + g)\Delta t^2$$

$$v_{t+1} = v_t + (R(a_m - a_b) + g)\Delta t$$

$$q_{t+1} = q_t \otimes q((w_t - w_b)\Delta t)$$

where $p_t$ and $p_{t+1}$ represent the position information at time points t and t+1 respectively, $v_t$ and $v_{t+1}$ represent the movement speeds at the time points t and t+1 respectively, and $q_t$ and $q_{t+1}$ represent the rotation quadruples at the time points t and t+1 respectively.

(4) The G Matrix of the Generalized Camera Model.

Figure 20:
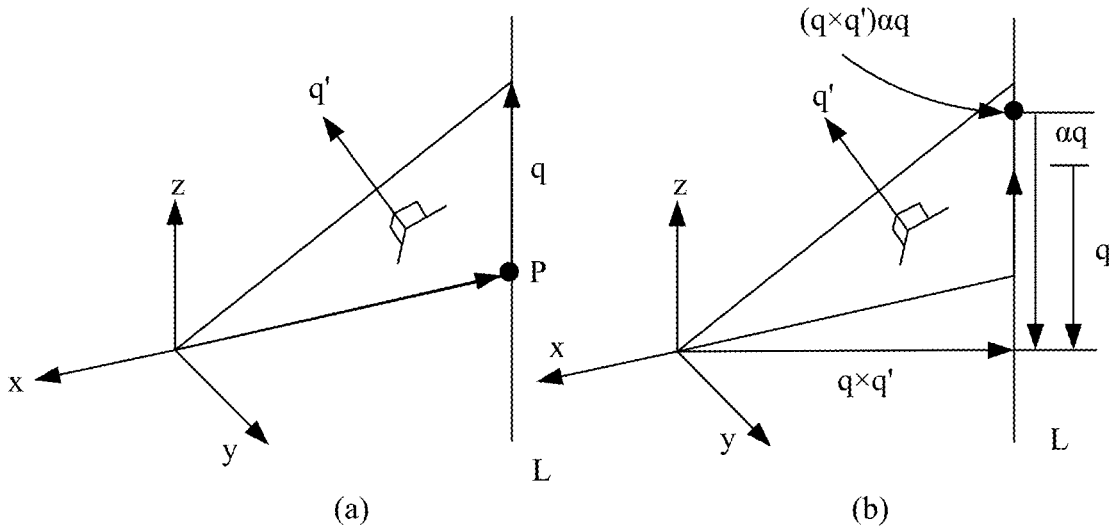
FIG. 20 is a schematic diagram of a Plucker coordinate system according to an embodiment.

The formula derivation of the G matrix of the generalized camera model is specifically as follows:

As shown in FIG. 20, P represents a three-dimensional point, and the position of the camera in the world coordinate system; and q represents the direction vector of the camera's light, which may be calculated based on the pixel points of the image coordinate system and the intrinsic parameters of the camera, so that the three-dimensional point on the camera's light has a scale factor a in the camera light direction.

The Plucker coordinate system is a common expression for representing a three-dimensional straight line. As shown in FIG. 20, q represents the direction vector of the straight line, and P represents a three-dimensional point on the straight line, then q'=P×q is the normal vector of the plane formed by the origin and the straight line, so that $q^T q'=0$, and then the expression of the three-dimensional point on the straight line can be written as:

$$q \times q' + aq$$

Light L of a camera C1 in the Plucker coordinate system may be expressed as:

$$L = \begin{pmatrix} q \\ q' \end{pmatrix}$$

Therefore, light L' of a camera C2 of a rigid body at the same time point may be expressed as:

$$L' = \begin{pmatrix} Rq \\ (RP+t) \times (Rq) \end{pmatrix} = \begin{pmatrix} Rq \\ Rq' + t \times (Rq) \end{pmatrix}$$

If light $$L = \left(q_1^T, q_1'^T\right) \text{ and light } L' = \left(q_2^T, q_2'^T\right)^T$$

intersect at a point, $$q_2^T q_1' + q_2'^T q_1 = 0$$

By combining the foregoing two formulas, the following can be obtained:

$$q_2^T(Rq_1' + t \times (Rq_1)) + q_2'^T (Rq_1) = 0$$

The following can be obtained through simplification:

$$q_2^T Rq_1' + q_2^T [t]_x (Rq_1) + q_2'^T (Rq_1) = 0$$

It is written in a matrix form as:

$$L_2^T GL_1 = \begin{pmatrix} q_2 \\ q_2' \end{pmatrix}^T \begin{bmatrix} [t]_x R & R \\ R & 0 \end{bmatrix} \begin{pmatrix} q_1 \\ q_1' \end{pmatrix} = 0$$

where $$G = \begin{bmatrix} [t]_x R & R \\ R & 0 \end{bmatrix}$$

The G matrix may also refer to an E matrix of a general camera model, where R and t respectively represent the rotation parameters and the translation parameters of different cameras or the same camera at different times. In the present disclosure, the relative poses and initial extrinsic parameters provided by preintegration are used to solve the G matrix, and external point filtering is performed based on the G matrix to select feature points that meet the conditions.

(5) Generalized Camera Model Initialization.

Three-dimensional points can be obtained by triangulating matched feature points by using extrinsic parameters between cameras, and the three-dimensional points are added to the map. An image of which the quantity of matched interior points is sufficient and the external points can still be retained after passing through the G matrix is selected from two frames of images as the first frame of image. Three-dimensional points are obtained by triangulating the first two frames of images. These three-dimensional points are relatively scattered and have some external points, which require further filtering.

(6) Generalized Camera Model PnP for Pose Solution.

The solution of PnP includes the following steps:

1. The light is represented by the Plucker coordinate system, where the positions of the three-dimensional points come from the translation between cameras, and the direction of the camera meets $q=K^{-1}p$, where K is the intrinsic parameter of the camera, and p represents the homogeneous coordinates of the pixel.
2. Restore depth information.
3. Calculate absolute orientations and translation.

Figure 21:
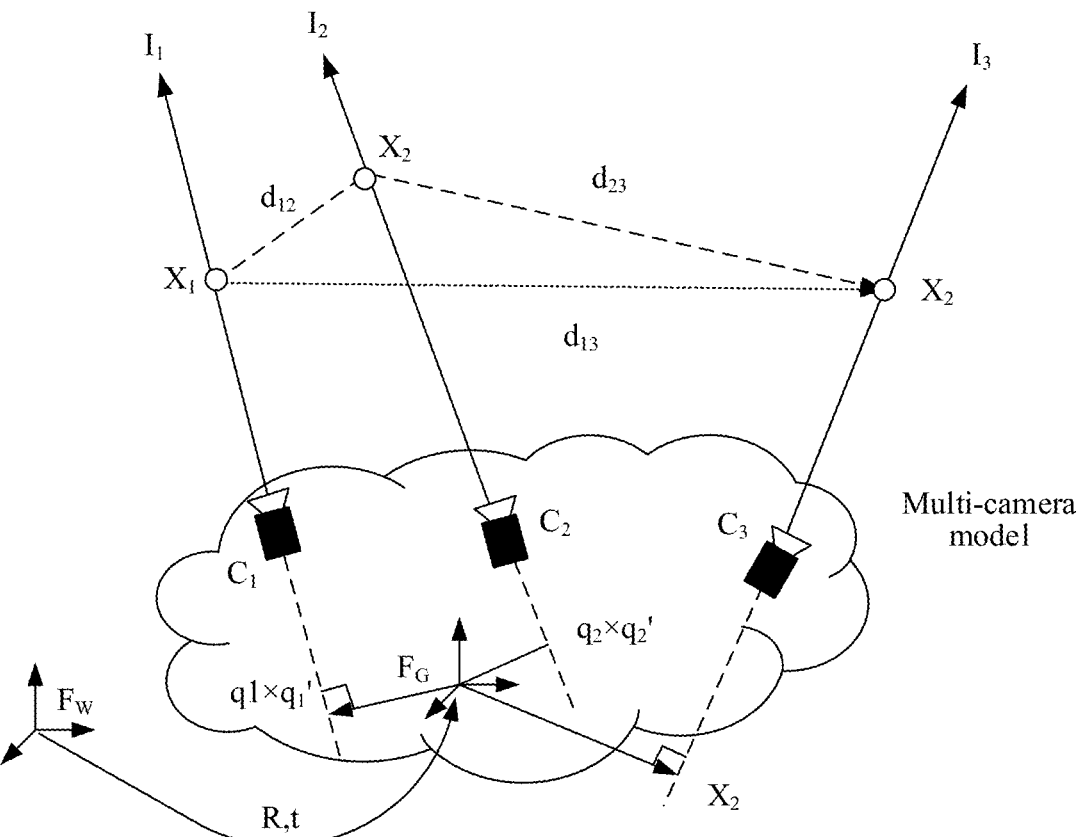
FIG. 21 is a schematic diagram of a generalized camera model according to an embodiment.

Formula Derivation Related to the Generalized Camera Model:

FIG. 21 is a schematic diagram of a generalized camera model, $C_1$, $C_2$ and $C_3$ respectively represent three different cameras, $X_1$, $X_2$ and $X_3$ respectively represent three-dimensional points in the world coordinate system, and $l_1$, $l_2$ and $l_3$ respectively represent the projection light of the cameras $C_1$, $C_2$ and $C_3$.

It can be learned from q×q'+aq that, the distance of a three-dimensional point in the space may be expressed as:

$$d_{ij}^2 = \|X_i - y_j\| = (a\lambda_i + b\lambda_j + c)^2$$

The following can be obtained through simplification:

$$k_{11}\lambda_1^2 + (k_{12}\lambda_2 + k_{13})\lambda_1 + \left(k_{14}\lambda_2^2 + k_{15}\lambda_2 + k_{16}\right) = 0$$

$$k_{21}\lambda_1^2 + (k_{22}\lambda_2 + k_{23})\lambda_1 + \left(k_{24}\lambda_2^2 + k_{25}\lambda_2 + k_{26}\right) = 0$$

$$k_{31}\lambda_1^2 + (k_{32}\lambda_2 + k_{33})\lambda_1 + \left(k_{34}\lambda_2^2 + k_{35}\lambda_2 + k_{36}\right) = 0$$

for a three-camera model, the foregoing three formulas are all second-order equations with three unknowns, and a plurality of solutions can be obtained. Similarly, for a five-camera model, five same equations can also be obtained and a plurality of solutions can be obtained.

In the present disclosure, generalized camera model PnP and Ransac are used to filter out external points and solve for the initial poses of the cameras. Subsequently, BA optimization is performed based on the calculated interior points, poses of the cameras are optimized by minimizing the reprojection errors, and a series of poses for the cameras are obtained.

(7) Optimize Rotation and Scales of the Cameras and the IMU

The camera's trajectory is aligned with the preintegration trajectory, and the rotation parameter and the scale factor between the camera and the IMU are optimized through alignment with the IMU's preintegrated pose within the sliding window (for example, the poses of the first 20 frames of images).

(8) Optimize Translation of the Cameras and the IMU

After the camera rotation parameters and scales are optimized, the translation can be corrected to a certain extent by minimizing the reprojection error.

Although the steps in the flowcharts involved in the foregoing embodiments are displayed sequentially according to instructions of arrows, these steps are not necessarily performed sequentially according to a sequence instructed by the arrows. Unless explicitly specified in this specification, execution of the steps is not strictly limited in the sequence, and the steps may be performed in other sequences. In addition, at least some steps in the flowcharts involved in the foregoing embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Based on the same inventive concept, an embodiment of the present disclosure further provides an apparatus for calibrating a camera and an IMU configured to implement the foregoing method for calibrating a camera and an IMU. The implementation solution provided by this apparatus to resolve the problem is similar to the implementation solution recorded in the foregoing method. Therefore, for specific limitations in the one or more embodiments of the apparatus for calibrating a camera and an IMU provided below, reference may be made to the limitations on the method for calibrating a camera and an IMU above, and details are not described herein again.

In an embodiment, as shown in FIG. 22, an apparatus for calibrating a camera and an IMU is provided, including an obtaining module 2202, a matching module 2204, a filtering module 2206, a processing module 2208, and an optimization module 2210, where the obtaining module 2202 is configured to obtain image sequences acquired by cameras;

the matching module 2204 is configured to match feature points of different images in the image sequences, to obtain matched feature points;

the filtering module 2206 is configured to filter the matched feature points to obtain target feature points;

the processing module 2208 is configured to convert the target feature points into three-dimensional points, and determining poses of the cameras based on the three-dimensional points and pixel points of the images in the image sequences that correspond to the three-dimensional points; and the optimization module 2210 is configured to optimize rotation parameters and scale change factors between an IMU and the cameras according to the poses of the cameras and a pose of the IMU.

In an embodiment, the poses of the cameras include poses within the sliding window; and the parameters include a rotation extrinsic parameter and a scale factor; and the optimization module is further configured to align the poses within the sliding window with the pose of the IMU; and optimize rotation parameters and scale change factors between the IMU and the cameras based on the aligned poses.

In an embodiment, the apparatus further includes:

the optimization module, further configured to: perform reprojection based on the three-dimensional points and the poses of the cameras, to obtain reprojection points; obtain an error function based on the target feature points and the reprojection points; and solve the error function, and optimize translation parameters between the IMU and the cameras based on a solution result of the error function.

In the foregoing embodiments, after obtaining the image sequences acquired by the cameras, the feature points of different images in the image sequences are matched, to effectively avoid relatively large position deviations when the target feature points in the matched feature points are triangulated to obtain the three-dimensional points, thereby helping to improve the position accuracy and robustness of the three-dimensional points. In addition, the matched feature points are further filtered based on the relationship matrix of the cameras, thereby reducing or avoiding the interference of noise points. By converting the filtered target feature points into three-dimensional points, and based on the three-dimensional point, corresponding pixel points, and an extrinsic parameter constraint condition between the cameras, the poses of the cameras can be accurately calculated. Finally, the parameters between the IMU and the cameras are optimized according to the poses of the cameras and the pose of the IMU, thereby effectively improving the accuracy of parameter calibration.

In an embodiment, the matched feature points include first matched points and second matched points; and the matching module is further configured to: extract the feature points from the images in the image sequences; perform intra-frame matching on the feature points of different images in the image sequences, to obtain the first matched points; and perform inter-frame matching on the feature points of different images in the image sequences, to obtain the second matched points.

In an embodiment, the matching module is further configured to: determine images acquired at the same time point in the image sequences; and perform feature matching on feature points corresponding to the images acquired at the same time point, to obtain the first matched points.

In an embodiment, the matching module is further configured to: align the images in the image sequences; place a sliding window at starting positions of the aligned image sequences; and match feature points of images acquired at a target time point in the sliding window and feature points of images acquired at other time points in the sliding window, and move, after the matching is completed, the sliding window to continue inter-frame matching, until inter-frame matching between feature points of images acquired at each target time point in the image sequences is completed, to obtain the second matched points.

In the foregoing embodiments, through the solution of performing feature point matching on images acquired by the cameras in the present disclosure, the accuracy of the three-dimensional points can be improved during triangulation calibration of the three-dimensional points, which helps to improve the calibration accuracy.

In an embodiment, the cameras are mounted at different orientations of a vehicle, and the IMU is mounted on the vehicle; or the cameras are mounted at different orientations of a virtual reality device or an extended reality device, and the IMU is mounted on the virtual reality device or the extended reality device.

In an embodiment, the apparatus further includes:

a detection module, configured to perform target detection on the images in the image sequences in a case that the cameras are mounted at different orientations of the vehicle, to obtain a road surface and a dynamic obstacle; and a mask module, configured to mask regions in which the road surface and the dynamic obstacle are respectively located in the images in the image sequences; and the matching module, further configured to match feature points of different images in the image sequences that are within unoccluded regions.

In an embodiment, the filtering module is further configured to: determine an epipolar line corresponding to a relationship matrix of the cameras in the images; determine distance values from the matched feature points to the epipolar line; and filter out matched feature points corresponding to distance values greater than a distance threshold, to obtain the target feature points.

In the foregoing embodiments, using the distance values from the matched feature point to the epipolar line to filter the matched feature points can effectively reduce the impact of noise points and further improve the accuracy of calibration.

In an embodiment, the apparatus further includes:

the obtaining module, further configured to obtain IMU data detected by the IMU;

a preintegration module, configured to perform preintegration based on the IMU data, to obtain a first preintegration variable and a second preintegration variable; and a first determining module, configured to determine attitude information according to the first preintegration variable and initial attitude information of the IMU; determine position information according to the second preintegration variable and initial position information of the IMU; and use the position information and the attitude information as a preintegrated pose of the IMU.

In the foregoing embodiments, by preintegrating the IMU data, the relative poses between the two frames of images may finally be obtained, and it is unnecessary to perform integration again for the all, thereby reducing the computational pressure.

In an embodiment, the apparatus further includes:

a second determining module, configured to: select a preset quantity of points from the three-dimensional points as interior points, and determine prediction poses of the cameras based on the interior points and pixel points corresponding to the interior points; and re-select, in response to that errors between initial poses and the prediction poses of the cameras do not meet an error condition, the preset quantity of points as interior points to determine prediction poses of the cameras, and until the errors between the initial poses and the prediction poses meet the error condition, use the interior points that are selected and lead to the error condition being met as target three-dimensional points; and the processing module, further configured to determine the poses of the cameras based on the target three-dimensional points and pixel points of images in the image sequences that correspond to the three-dimensional points.

In the foregoing embodiments, by filtering three-dimensional points, the impact of mismatching on parameter calibration can be effectively reduced, thereby effectively improving the accuracy of parameter calibration.

All or some of the modules in the foregoing apparatus for calibrating a camera and an IMU may be implemented by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules. Moreover, each module can be part of an overall module that includes the functionalities of the module.

In an embodiment, a computer device is provided. The computer device may be a server or a terminal. A description is provided by using the terminal as an example, and a diagram of an internal structure thereof may be shown in FIG. 23. The computer device includes a processor, a memory, an input/output interface, a communication interface, a display screen, and an input apparatus. The processor, the memory, and the input/output interface are connected to each other by a system bus, and the communication interface, the display unit, and the input apparatus are connected to the system bus by the input/output interface. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The input/output interface of the computer device is configured to exchange information between the processor and an external device. The communication interface of the computer device is configured to communicate with an external terminal in a wired or wireless manner, and the wireless manner may be implemented by using Wi-Fi, a mobile cellular network, near field communication (NFC), or other technologies. The computer program is executed by the processor to implement a method for calibrating a camera and an IMU. The display unit of the computer device is configured to form a visible picture, which may be a display screen, a projection apparatus, or a virtual reality imaging apparatus. The display screen may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 23 is only a block diagram of a partial structure related to the solution of the present disclosure, and does not limit the computer device to which the solution of the present disclosure is applied. Specifically, the specific computer device may include more components or fewer components than those shown in the figure, or some components may be combined, or a different component deployment may be used.

In an embodiment, a computer device is provided, including a memory and a processor, the memory storing a computer program, the computer program when executed by the processor, causing the processor to implement the steps of the foregoing method for calibrating a camera and an IMU.

In an embodiment, a computer-readable storage medium is provided, storing a computer program, the computer program, when executed by a processor, implementing the steps of the foregoing method for calibrating a camera and an IMU.

In an embodiment, a computer program product is provided, including a computer program, the computer program, when executed by a processor, implementing the steps of the foregoing method for calibrating a camera and an IMU.

Both user information (including but not limited to user device information and user personal information) and data (including but not limited to data used for analysis, stored data, and displayed data) involved in the present disclosure are information and data authorized by the user or fully authorized by all parties, and the collection, use, and processing of relevant data need to comply with relevant laws, regulations and standards of relevant countries and regions.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a database, or another medium used in the embodiments provided in the present disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a resistive memory (ReRAM), a magnetoresistive random access memory (MRAM), a ferroelectric random access memory (FRAM), a phase change memory (PCM), a graphene memory, and the like. The volatile memory may include a random access memory (RAM), an external cache, or the like. For the purpose of description instead of limitation, the RAM is available in a plurality of forms, such as a static RAM (SRAM) or a dynamic RAM (DRAM). The databases involved in the embodiments provided in the present disclosure may include at least one of relational databases or non-relational databases. The non-relational databases may include blockchain-based distributed databases and the like, and are not limited thereto. The processors involved in the embodiments provided in the present disclosure may be general-purpose processors, central processing units, graphics processors, digital signal processors, programmable logic devices, quantum computing-based data processing logic devices, and the like, and are not limited thereto.

The technical features in the foregoing embodiments may be combined in different manners to form other embodiments. For concise description, not all possible combinations of the technical features in the embodiments are described. However, provided that combinations of the technical features do not conflict with each other, the combinations of the technical features are considered as falling within the scope recorded in this specification.

The foregoing embodiments show only several implementations of the present disclosure and are described in detail, which, however, are not to be construed as a limitation to the patent scope of the present disclosure. A person of ordinary skill in the art may further make several variations and improvements without departing from the ideas of the present disclosure, and such variations and improvements all fall within the protection scope of the present disclosure. Therefore, the protection scope of the present disclosure shall be subject to the appended claims.

What is claimed is:

1. A method for calibrating cameras and an inertial measurement unit (IMU), performed by a computer device, the method comprising:
    obtaining image sequences acquired by the cameras;
    matching feature points of different images in the image sequences, to obtain matched feature points;
    selecting target feature points from the matched feature points, comprising;
        determining an epipolar line corresponding to a relationship matrix of the cameras in the images;
        determining distance values from the matched feature points to the epipolar line; and
        filtering out matched feature points corresponding to distance values greater than a distance threshold, to obtain the target feature points;
    converting the target feature points into three-dimensional points, and determining poses of the cameras based on the three-dimensional points and pixel points of the images in the image sequences that correspond to the three-dimensional points; and
    optimizing parameters between the IMU and the cameras according to the poses of the cameras and a pose of the IMU.

2. The method according to claim 1, wherein the matched feature points comprise first matched points and second matched points, and the matching feature points of different images in the image sequences, to obtain matched feature points comprises:
    extracting the feature points from the images in the image sequences;
    performing intra-frame matching on the feature points of different images in the image sequences, to obtain the first matched points; and
    performing inter-frame matching on the feature points of different images in the image sequences, to obtain the second matched points.

3. The method according to claim 2, wherein the performing intra-frame matching on the feature points of different images in the image sequences, to obtain the first matched points comprises:
    determining images acquired at a same time point in the image sequences; and
    performing feature matching on feature points corresponding to the images acquired at the same time point, to obtain the first matched points.

4. The method according to claim 2 wherein the performing inter-frame matching on the feature points of different images in the image sequences, to obtain the second matched points comprises:
    aligning the images in the image sequences;
    placing a sliding window at starting positions of the aligned image sequences; and
    matching feature points of images acquired at a target time point in the sliding window and feature points of images acquired at other time points in the sliding window, and moving, after the matching is completed, the sliding window to continue inter-frame matching, until inter-frame matching between feature points of images acquired at each target time point in the image sequences is completed, to obtain the second matched points.

5. The method according to claim 1, wherein the cameras are mounted at different orientations of a vehicle, and the IMU is mounted on the vehicle; or the cameras are mounted at different orientations of a virtual reality device or an extended reality device, and the IMU is mounted on the virtual reality device or the extended reality device.

6. The method according to claim 1, wherein the method further comprises:

performing target detection on the images in the image sequences in a case that the cameras are mounted at different orientations of the vehicle, to obtain a road surface and a dynamic obstacle; and masking the road surface and the dynamic obstacle in the images in the image sequences; and the matching feature points of different images in the image sequences comprises:

matching feature points of different images in the image sequences that are within unoccluded regions.

7. The method according to claim 1, further comprising:

obtaining IMU data detected by the IMU;

performing preintegration based on the IMU data, to obtain a first preintegration variable and a second preintegration variable;

determining attitude information according to the first preintegration variable and initial attitude information of the IMU;

determining position information according to the second preintegration variable and initial position information of the IMU; and using the position information and the attitude information as a preintegrated pose of the IMU.

8. The method according to claim 1, wherein the method further comprises:

selecting a preset quantity of points from the three-dimensional points as interior points, and determining prediction poses of the cameras based on the interior points and pixel points corresponding to the interior points; and re-selecting, in response to that errors between initial poses and the prediction poses of the cameras do not meet an error condition, the preset quantity of points as interior points to determine prediction poses of the cameras, and until the errors between the initial poses and the prediction poses meet the error condition, using the interior points that are selected and lead to the error condition being met as target three-dimensional points; and the determining poses of the cameras based on the three-dimensional points and pixel points of the images in the image sequences that correspond to the three-dimensional points comprises:

determining the poses of the cameras based on the target three-dimensional points and pixel points of target images in the image sequences that correspond to the target three-dimensional points.

9. The method according to claim 1, wherein the poses of the cameras comprise poses within a sliding window; and the parameters comprise a rotation extrinsic parameter and a scale factor; and the optimizing parameters between the IMU and the cameras according to the poses of the cameras and a pose of the IMU comprises:

aligning the poses within the sliding window with the pose of the IMU; and optimizing rotation parameters and scale change factors between the IMU and the cameras based on the aligned poses.

10. The method according to claim 1, further comprising:

performing reprojection based on the three-dimensional points and the poses of the cameras, to obtain reprojection points;

obtaining an error function based on the target feature points and the reprojection points; and solving the error function, and optimizing translation parameters between the IMU and the cameras based on a solution result of the error function.

11. The method according to claim 1, further comprising:

triangulating the target feature points based on camera parameters, to obtain the three-dimensional points corresponding to the target feature points, the camera parameters comprising intrinsic parameters of the cameras and extrinsic parameters of the cameras.

12. The method according to claim 1, further comprising:

adding the three-dimensional points of first two frames of images in the image sequences to a map, to obtain three-dimensional point map data.

13. The method according to claim 1, wherein the selecting target feature points from the matched feature points comprises:

filtering the matched feature points based on the relationship matrix of the cameras, to obtain the target feature points, the relationship matrix being determined based on the extrinsic parameters of the cameras and the preintegrated pose of the IMU.

14. The method according to claim 7, wherein the IMU data comprises a movement speed detected by the IMU and an angular velocity detected by a gyroscope.

15. An apparatus for calibrating cameras and an inertial measurement unit (IMU), comprising:

at least one memory and at least one processor, the at least one memory storing a computer program, the at least one processor, when executing the computer program, implementing:

obtaining image sequences acquired by the cameras;

matching feature points of different images in the image sequences, to obtain matched feature points;

selecting target feature points from the matched feature points, comprising:

determining an epipolar line corresponding to a relationship matrix of the cameras in the images;

determining distance values from the matched feature points to the epipolar line; and filtering out matched feature points corresponding to distance values greater than a distance threshold, to obtain the target feature points;

converting the target feature points into three-dimensional points, and determining poses of the cameras based on the three-dimensional points and pixel points of the images in the image sequences that correspond to the three-dimensional points; and optimizing parameters between the IMU and the cameras according to the poses of the cameras and a pose of the IMU.

16. The apparatus according to claim 15, wherein the matched feature points comprise first matched points and second matched points, and the matching feature points of different images in the image sequences, to obtain matched feature points comprises:

extracting the feature points from the images in the image sequences;

performing intra-frame matching on the feature points of different images in the image sequences, to obtain the first matched points; and performing inter-frame matching on the feature points of different images in the image sequences, to obtain the second matched points.

17. The apparatus according to claim 16, wherein the performing intra-frame matching on the feature points of different images in the image sequences, to obtain the first matched points comprises:

determining images acquired at a same time point in the image sequences; and performing feature matching on feature points corresponding to the images acquired at the same time point, to obtain the first matched points.

18. The apparatus according to claim 16, wherein the performing inter-frame matching on the feature points of different images in the image sequences, to obtain the second matched points comprises:

aligning the images in the image sequences;

placing a sliding window at starting positions of the aligned image sequences; and matching feature points of images acquired at a target time point in the sliding window and feature points of images acquired at other time points in the sliding window, and moving, after the matching is completed, the sliding window to continue inter-frame matching, until inter-frame matching between feature points of images acquired at each target time point in the image sequences is completed, to obtain the second matched points.

19. A non-transitory computer-readable storage medium, storing a computer program, the computer program, when executed by at least one processor coupled to cameras and an IMU, causing the at least one processor to implement:

obtaining image sequences acquired by the cameras;

matching feature points of different images in the image sequences, to obtain matched feature points;

selecting target feature points from the matched feature points, comprising;

determining an epipolar line corresponding to a relationship matrix of the cameras in the images;

determining distance values from the matched feature points to the epipolar line; and filtering out matched feature points corresponding to distance values greater than a distance threshold, to obtain the target feature points;

converting the target feature points into three-dimensional points, and determining poses of the cameras based on the three-dimensional points and pixel points of the images in the image sequences that correspond to the three-dimensional points; and optimizing parameters between the IMU and the cameras according to the poses of the cameras and a pose of the IMU.

* * * * *